United States Patent [19]

Göransson et al.

[11] Patent Number: 5,999,422
[45] Date of Patent: Dec. 7, 1999

[54] CONTROL EQUIPMENT FOR AN ACTIVE FILTER

[75] Inventors: Tor Göransson; Henrik Nilsson, both of Malmö; Anders Åberg, Staffanstorp, all of Sweden

[73] Assignee: Asea Brown Boveri AB, Vasteras, Sweden

[21] Appl. No.: 09/155,890

[22] PCT Filed: Mar. 10, 1998

[86] PCT No.: PCT/SE98/00421

§ 371 Date: Dec. 28, 1998

§ 102(e) Date: Dec. 28, 1998

[87] PCT Pub. No.: WO98/21924

PCT Pub. Date: May 28, 1998

[30]     Foreign Application Priority Data

Mar. 13, 1997 [SE] Sweden ................................. 9700897

[51] Int. Cl.⁶ ............................. H02M 1/14; H02H 7/00
[52] U.S. Cl. ............................................. 363/39; 363/51
[58] Field of Search ...................... 363/35, 39, 44–47, 363/51; 323/205, 207; 307/105, 521

[56]                  References Cited

U.S. PATENT DOCUMENTS

| 4,224,660 | 9/1980 | Mohan ....................................... 363/48 |
| 4,812,669 | 3/1989 | Takeda et al. ........................... 307/105 |
| 4,930,064 | 5/1990 | Tanaka et al. ........................... 363/161 |
| 5,132,894 | 7/1992 | Rozman et al. ........................... 363/51 |
| 5,296,764 | 3/1994 | Asplund et al. ......................... 307/521 |
| 5,323,330 | 6/1994 | Asplund et al. ..................... 364/528.27 |
| 5,397,927 | 3/1995 | Suelzle et al. ........................... 307/105 |
| 5,539,654 | 7/1996 | .ANG.berg ........................ 364/528.33 |
| 5,548,165 | 8/1996 | Mohan et al. ............................. 307/36 |
| 5,737,198 | 4/1998 | Larsen et al. ........................... 363/40 |
| 5,757,099 | 5/1998 | Cheng et al. ........................... 307/105 |

FOREIGN PATENT DOCUMENTS 0 642 211 A2 of 1995 European Pat. Off. .
    469 361  of 1993 Sweden .

OTHER PUBLICATIONS

Gyugyi et al., Active AC Power Filters, Westinghouse Electric Corporation, Research Laboratories, Pittsburgh, PA, IAS '76 Annual, pp. 529–535.
Wong, et al., Feasibiity Study of AC–and DC–Side Active Filters for HVDC Converter Terminals, IEEE Transactions on Power Delivery, vol. 4, No. 4, 1989, pp. 2067–2075.
Asplund et al., Active DC filters for HVDC systems, ABB Review Jun. 7, 1995, pp. 17–21.
Anwendung aktiver Saugkreise in elektrischen Energieversorgungsnetzen, etzArchiv Bd. 9 (1987) H.4, pp. 93–100.
C. Tuttas, Kaiserslautern, Regelung von Blindleistungskompensatoren mit aktiven Filtern, Anwendungsaufsatz, Automatisierungstechnik at 34 Jahrgang, Heft Aug. 1986, pp. 302–310.

*Primary Examiner*—Adolf Deneke Berhane
*Attorney, Agent, or Firm*—Pollock, Vande, Sande & Amernick

[57]                      ABSTRACT

An active filter (2) is connected to a dc circuit (L1, L2) in a converter (SR1) in an installation for transmission of high-voltage direct current. Control equipment (5) generates, in dependence on a control signal, a control order (SCF) for the active filter which, in dependence thereon, generates and supplies to the dc connection one of a filter voltage (UF) and a filter current (IF) for reducing at least one tone of a chosen tone frequency in a current (Id) in the dc connection. The control equipment comprises a controlling unit which forms a controller signal in dependence on a supplied current measurement value (IM) of the current in the dc connection, and an identification unit. The identification unit forms a first compensating parameter in dependence on the current measurement value and on an excitation signal generated by the control equipment and added to the control order. The control equipment forms the control signal in dependence on the controlling signal and the compensating parameter, which has been formed such that the sum thereof and of the phase shift for a transfer function from the control signal to the current measurement value at the chosen tone frequency is at least approximately equal to a preselected value.

19 Claims, 13 Drawing Sheets

CONTROL EQUIPMENT FOR AN ACTIVE FILTER

TECHNICAL FIELD

The present invention relates to control equipment for an active filter, connected to a dc circuit in a converter in an installation for transmission of high-voltage direct current.

BACKGROUND ART

For a general description of installations for transmission by means of high-voltage direct current, reference is made to J. Arillaga: High Voltage Direct Current Transmission, London 1988.

Examples of the use, design and connection of active filters in connection with such installations are given in W Zhang, G Asplund, A Åberg, U Jonsson, O Lööf: Active d. c. filter for HVDC system, ABB Review 1995, Nos. 6-7, pages 17–21, in L Gyugui, E. C. Sstrycula: Active AC Power Filters, IAS 76 Annual, pages 529–535, and in IEEE publication 89 WM 123-1 PWRD (IEEE/PES 1989 Winter Meeting, New York 1989): Cheuksum Wong, Ned Mohan, Selwyn E. Wright and Karl N. Mortensen: Feasibility Study of AC- and DC-Side Active Filters for HVDC Converter Terminals.

U.S. Pat. No. 5,296,764 describes a method for reduction of disturbances on an outgoing line from an electric power network by means of an active filter, the control order of which is formed in dependence on a control signal from a controlling device. This control signal is formed in dependence on the deviation of a current or a voltage, sensed in the power network, from a desired value, and is forwarded to the control order with such signs that the disturbances are reduced. According to the described method, the control signal is formed from the controlling device as a sequence of signal values, repeated with a certain periodicity corresponding to the periodicity for a source of disturbance in the power network. The feedback circuit comprises a filter which, at least within the frequency range of interest to the application, makes possible a linearization of the transfer function from the control signal of the controlling device to the deviation of the sensed current or voltage from the desired value, a compensation for non-minimum phase properties in the transfer function mentioned being included therein. By utilizing the periodicity of the disturbance source, a control circuit with negative feedback may, with good stability and damping, be implemented also for those applications where, for example, a long line is connected to the power network. The effort required for setting of parameters in the filter which compensates for the above-mentioned transfer function is, however, demanding and increases as a better approximation of the dynamic properties of the power network within the frequency range in question is aimed at. Further, switching operations in the power network lead to its transfer function being changed, and to this is to be added the fact that the frequency of the disturbance source is usually not completely stable.

An article in a periodical by C Tuttas: Anwendung aktiver Saugkreise in elektrischen Energieversorgungsnetzen, etzArchiv 1987, H.4, pages 93–100, describes a three-phase active filter for connection to an ac network for damping of resonances and certain definite harmonic currents in the network. A controlling unit for control of a filter current of a certain frequency $\omega_f$ comprises a comparison circuit for forming a control deviation between a sensed filter current and a reference value therefor. The control deviation, which is an ac signal of the form $\Delta I^* \sin(\omega_f t + \phi)$ is converted, by multiplication by a signal of the form $\sin(\omega_f t)$ and by a signal of the form $\cos(\omega_f t)$ as well as by a current mean-value formation of the respective signals, obtained by the multiplications, into two components $\Delta I_{sin} = \Delta I^* \cos \phi$ and $\Delta I_{cos} = \Delta I^* \sin \phi$, respectively. These components, which thus are of the frequency zero, together contain information about the amplitude and phase position of the control deviation. Each one of these components is supplied to a respective controller with proportional-integrating characteristic. The output signals from the respective controller are multiplied by respectively one signal of the form $\sin(\omega_f t)$ and one signal of the form $\cos(\omega_f t)$, and are then added to form a control signal of the frequency f for the active filter. This control signal is supplied to which is shown in the article as a block designated 'Matrix' comprised in the controlling unit. The purpose of this block is stated to be to decouple and adapt the controller to the control distance, by which is probably meant an adaptation to the transfer function from the control signal to the sensed filter current.

This 'Matrix' is further discussed in an article in a periodical by C Tuttas: Regelung von Blindleistungskompensatoren mit aktiven Filtern. Automatisierungstechnik 1986, H.8, pages 302–310, from which it seems to be clear that the parameters in this 'Matrix' are calculated on the basis of externally known data about the ac network and component data for the filter. The accuracy in the adaptation to the above-mentioned transfer function is thus dependent on how well known the data are on which the calculation is based and, as mentioned above, switchings in the power network lead to its transfer function being changed and to this is to be added the fact that the frequency of the disturbance source is usually not completely stable.

SUMMARY OF THE INVENTION

The object of the invention is to achieve control equipment of the kind described in the introductory part of the description, by means of which a simplified and improved setting of the control parameters thereof for adaptation to the transfer function from a control order, generated by the control equipment, to a measured value, supplied to the control equipment, of a current in the dc circuit mentioned may be achieved.

What characterizes control equipment according to the invention will be clear from the appended claims.

Advantageous improvements of the invention will become clear from the following description and the appended claims.

BRIEF DESCRIPTION OF THE DRAWINGS

The invention will be described in greater detail by description of embodiments with reference to the accompanying drawings, wherein.

DESCRIPTION OF THE PREFERRED EMBODIMENTS

The following concepts and designations, inter alia, are used in the following description.

System frequency $\omega$ (for an alternating-voltage network): $\omega=2\pi f$, where f usually is 50 or 60 Herz. An nth tone Idn: an interference signal of a tone frequency $n\omega$, which is supplied to a control unit or identification equipment according to the invention, for example the ac component $Idn=An*sin(n\omega + \alpha_n)$ of the tone frequency $n\omega$ of the current Id in a dc connection in an installation for transmission of high-voltage direct current. The control equipment according to the invention comprises means which generate, and add to the control order, an excitation signal of an excitation frequency $\omega_e$, whereby the measured value supplied to the control unit or the identification equipment will also contain a component of the excitation frequency $\omega_e$.

Ordinal number n (for a tone): a real number different from zero, preferably an integer, n=n1, n2, . . . , nm. Especially in installations for transmission of high-voltage direct current, where the converters included, because of their mode of operation, generate on their direct-voltage side harmonics to the system frequency $\omega$ of the alternating-voltage network of the ordinal numbers q=kp, where p is the pulse number of the converter and k is a positive integer, the ordinal numbers may be chosen as integer multiples of the pulse number of the converter.

The device comprises calculating members, shown in the figures in the form of block diagrams, and it is to be understood that the input and output signals to the respective blocks may consist of signals or calculating values. The words signal value and calculating value are therefore used synonymously in the following.

In order not to burden the description with distinctions which are self-explanatory to the man skilled in the art, generally the same designations are used for the currents and voltages which occur in the installation as for the measured values and signals/calculating values, corresponding to these quantities, which are supplied to and processed in the control equipment described below.

The block diagrams show blocks for forming certain calculating values, which are used in other shown blocks connecting lines between these blocks have in certain cases been omitted in order not to burden the drawings, but it is to be understood that the respective calculating values are obtained from the blocks in which they are formed.

Furthermore, it is to be understood that, although the blocks shown in the figures are referred to as units, members, filters, etc., these are to be understood as means for achieving the desired function, especially in the event that their functions are implemented as software in, for example, microprocessors.

Figure 1:
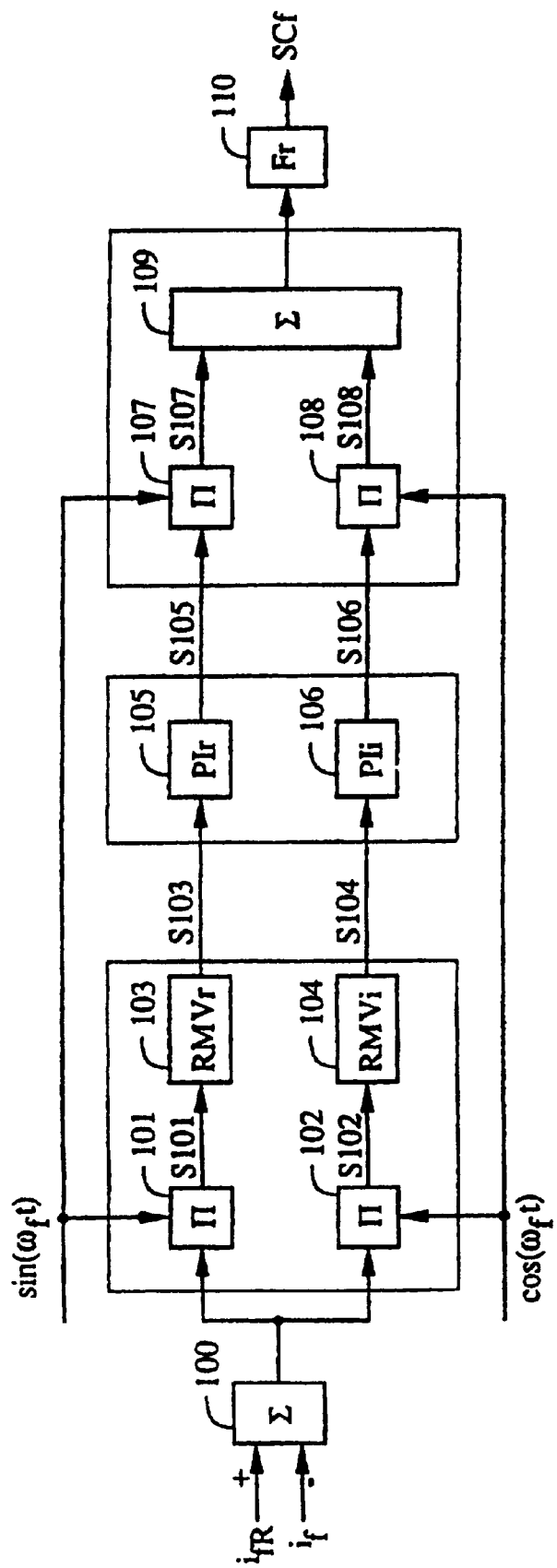
FIG. 1 shows, in the form of a block diagram, a controlling unit of a known embodiment, FIG. 2 schematically shows an installation for transmission of high-voltage direct current with an active filter according to the invention.

FIG. 1 shows in the form of a block diagram a controlling unit of the design described above with reference to C Tuttas: etzArchiv 1987. A comparing member 100 forms the difference between a reference value $i_{fR}$ of a filter current $i_f$ and a sensed value of the filter current. The reference value is of the form $I*sin(\omega_f t+\phi)$ and the difference mentioned, which is of the form $\Delta I*sin(\omega_f t+\phi)$, is supplied to a multiplier 101 and is multiplied there by a signal $sin(\omega_f t)$ as well as to a multiplier 102 and is multiplied there by a signal $cos(\omega_f t)$. The output signal S101 from the multiplier 101 is supplied to a mean-value forming member 103 which forms, as output signal S103, a running mean value of the supplied signal. The output signal S103 is supplied to a controller 105 with proportional-integrating characteristic which forms an output signal S105. This output signal is supplied to a multiplier 107 which forms an output signal S107 by multiplication by the signal $sin(\omega_f t)$.

The output signal S102 from the multiplier 102 is processed in analogous manner in a mean-value forming member 104, a controller 106 and a multiplier 108, where the multiplication takes place with the signal $cos(\omega_f t)$ for forming the output signal S108.

Using known mathematical relationships, it is found that the output signal S101 contains a component of the frequency zero, proportional to $\Delta I*cos\,\phi$, and a component of a frequency $2\omega_f$ equal to twice the frequency for the reference value $i_{fR}$. In analogous manner, it is found that the output signal S102 contains a component of the frequency zero, proportional to $\Delta I*sin\,\phi$, as well as a component of a frequency $2\omega_f$ equal to twice the frequency of the reference value $i_{fR}$. The components of the double frequency $2\omega_f$ are eliminated in the mean-value forming members 103 and 104, respectively, and the controllers 105 and 106 are thus supplied with signals of the frequency zero, which together contain information about the amplitude $\Delta I$ and the phase position $\phi$ for the difference between the reference value $i_{fR}$ and the filter current $i_f$.

The output signals S107 and S108 are supplied to a summing member 109 and the sum of these signals is supplied to a block 110 which forms a control signal SCf for the active filter. The block 110 is stated to have a transfer function for adaptation of the controlling unit to the transfer function from the control signal to the sensed filter current.

Figure 2:
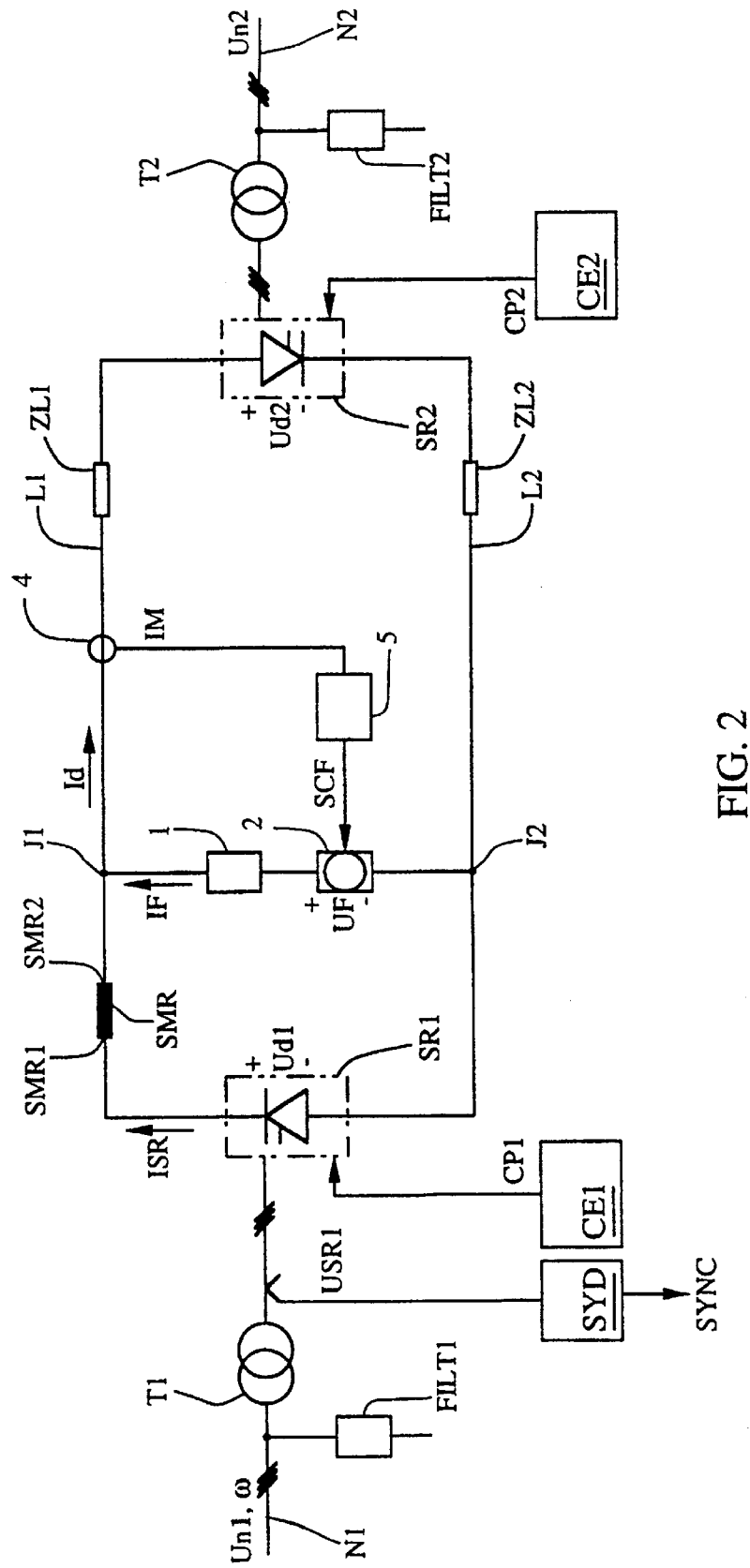

FIG. 2 shows a single-pole installation for transmission of high-voltage direct current between two three-phase alternating-voltage networks N1 and N2 (only roughly indicated) with the system frequency $\omega=2\pi f$, where f is usually 50 or 60 Hz. One converter SR1 is connected with its alternating-voltage terminals to the network N1 via a transformer T1, and one converter SR2 is connected with its alternating-voltage terminals to the network N2 via a transformer T2. A dc connection L1, L2 connects the direct-voltage terminals of the converter SR1 to the corresponding direct-voltage terminals of the converter SR2. The conductor L1 may, for example, consist of an overhead line or a cable and the conductor L2 may consist of ground, whereby one of the direct-voltage terminals of the converters is put into connection with a ground terminal via separate electrode lines (not shown in the figure). The impedances of the dc connection are designated ZL1 and ZL2, respectively, in the figure. Further, shunt filters FILT1 and FILT2, respectively, for generation of reactive power and for filtering harmonics generated by the converters, are connected to the respective alternating-voltage network. In a known manner, the converters may be designed as two series-connected 6-pulse bridges to form a 12-pulse connection, the transformers on the secondary side comprising a Y-connected and a D-connected winding. Each converter is equipped with a control device, CE1 and CE2, respectively, of a kind known per se, which, in dependence on supplied control orders (not shown in the figure) and sensed quantities in the installation, generates control pulses CP1 and CP2, respectively, for controlling the valves included in the converters.

In the converter SR1, a smoothing reactor SMR with terminals SMR1 and SMR2 is connected into the conductor L1. Between a connection point J1 on the conductor L1, located beyond the smoothing reactor as viewed from the converter SR1, and a connection point J2 on the conductor L2, a series connection comprising a passive impedance unit 1 and an active filter 2 is connected. The passive impedance unit may, for example, be in the form of a tuned filter or of a switching element in the form of a capacitor. The active filter, which is of a kind known per se, generates, in dependence on a supplied control order SCF, a filter voltage UH in the series circuit between the connection points J1 and J2. The voltage UF generated by the active filter gives rise to a current IF in the series circuit, which current, at the connection point J1, is added to the current ISR flowing through the converter.

The converter SR1 generates a voltage Ud1 between their direct-voltage terminals and it is known that this voltage, because of the mode of operation of the converter, contains harmonics, superimposed on the direct voltage, which are referred to below as an alternating voltage U1, In a theoretical ideal case, only harmonics to the system frequency ω of the alternating-voltage network of the ordinal numbers q=kp occur on the direct-voltage side of the converter, where p is the pulse number of the converter and k is a positive integer, that is, for a converter in a 12-pulse connection, alternating voltages of the $12^{th}$, $24^{th}$, $36^{th}$ etc. harmonic tone occur on the direct-voltage side, in an alternating-voltage network for 50 Hz corresponding to the tone frequencies 600 Hz, 1200 Hz, 1800 Hz, etc. However, asymmetries between the phases and commutations in the converters give rise to harmonics of other ordinal numbers also. The current Id through the conductor L1 will therefore, in addition to a dc component Id0, also contain an ac component Idh(t), which may be written as a sum of a number of harmonic tones Idk.

$$Id = Id0 + Idh(t) = Id0 + \sum_{k=1}^{\infty} Idk = Id0 + \sum_{k=1}^{\infty} Ak * \sin(k\omega t + \alpha_k) \qquad (1)$$

where Ak is the amplitude of the respective tone, k is a positive integer, ω is the angular system frequency of the alternating-voltage network N1, t is the time and $\alpha_k$ the phase position of the tone relative to the zero crossing for the voltage in a chosen phase of the alternating-voltage network N1.

The smoothing reactor to a certain extent, but not completely, damps the above-mentioned harmonics in the current.

A current measuring device 4, arranged at the conductor L1, as viewed from the converter SR1, beyond the connection point J1, is arranged, in some manner known per se, to form as output signal a current measurement value IM corresponding to the ac component Idh(t) of the current Id, that is, $$IM = \sum_{k=1}^{\infty} Ak * \sin(k\omega t + \alpha_k) \qquad (1')$$

The current measurement value is supplied to control equipment 5 for the active filter 2, which, in a manner to be described in greater detail below, in dependence on this supplied signal, generates the control order SCF.

Figure 3:
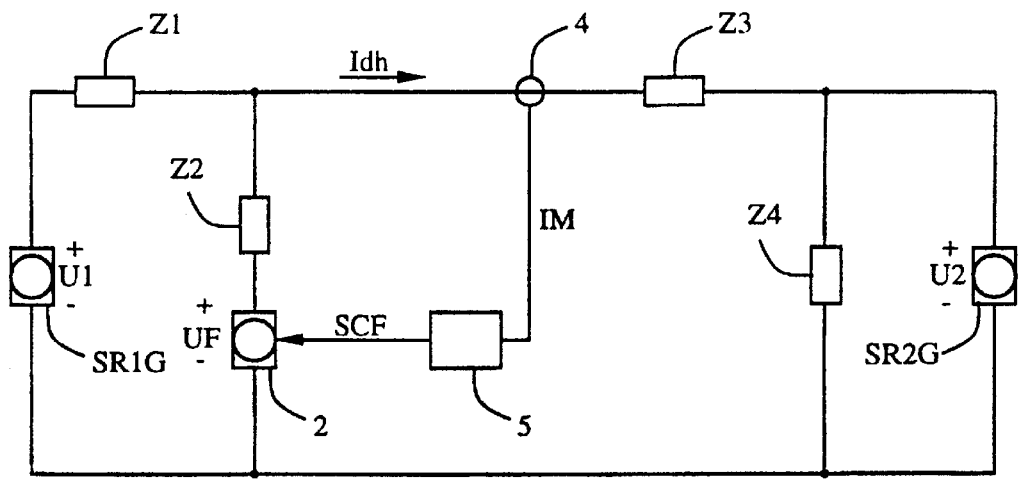
FIG. 3 shows an equivalent diagram for the installation according to FIG. 2.

FIG. 3 shows an equivalent diagram for the installation according to FIG. 2. The converters SR1 and SR2 are here replaced by equivalent voltage generators SR1G and SR2G, respectively, which generate the above-mentioned voltage harmonics, in this figure designated U1 and U2, respectively. The smoothing reactor is replaced by a corresponding impedance element Z1, the passive impedance unit 1 by an impedance element Z2, and the impedances ZL1 and ZL2 of the dc connection by an impedance element Z3. In parallel with the voltage generator SR2G there is an impedance element Z4 corresponding to the impedance elements Z1 and Z2 shown at the converter SR1.

Figure 4:
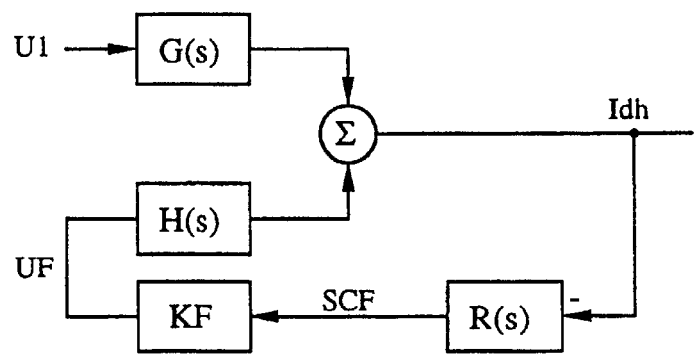
FIG. 4 shows, in the form of a block diagram, the relationships between some quantities in the installation according to FIG. 2.

FIG. 4 shows a block diagram corresponding to the equivalent diagram according to FIG. 3, where, for the respective blocks, the transfer functions of the blocks are expressed in the frequency plane with the Laplace operator 's'.

G(s) is the transfer function from the alternating voltage U1, generated by the converter SR1, to the ac component Idh of the current in the dc connection, and H(s) is the transfer function from the voltage UF, generated by the active filter, to the same ac component. Between the control order SCF, supplied to the active filter, and the voltage UF, there is assumed to prevail a constant ratio such that UF=KF*SCF. The transfer function from the ac component Idh to the control order SCF is designated R(s), and a negative sign at the input of the corresponding block denotes a negative feedback of the current measurement value IM from the current measuring device for the purpose of achieving a voltage Uf of such polarity that the tones in the current Id, which correspond to the current measurement value, are reduced by means of the voltage UF. The block diagram is simplified to such an extent that it is assumed that the influence from the converter SR2 may be omitted, that is, with designations from FIG. 3, U2=0. Further, it has been assumed that the influence from reflections in the dc connection may be omitted, that is, with designations from FIG. 2, the impedance Z4 is given an infinite value. From FIG. 3 the following is obtained $$Idh(s)=U1(s)G(s)/(1+R(s)*KF*H(s)) \qquad (2)$$

It is clear from expression (2) that, by including a controlling unit in the control unit, where the transfer function of the controlling unit exhibits a maximum at a chosen tone frequency nω, the ac component Idh for the chosen tone is minimized. The control order to the active filter is thus formed in dependence on an output signal, referred to below as a control signal, from the controlling unit in such a way that the current IF at the connection point J1 is added to the current ISR in opposition to the component thereof of the tone frequency. By including in the control unit additional controlling units, the transfer functions of which exhibit maxima for other tones, the ac component Idh may be minimized for each one of the chosen tones.

Figure 5:
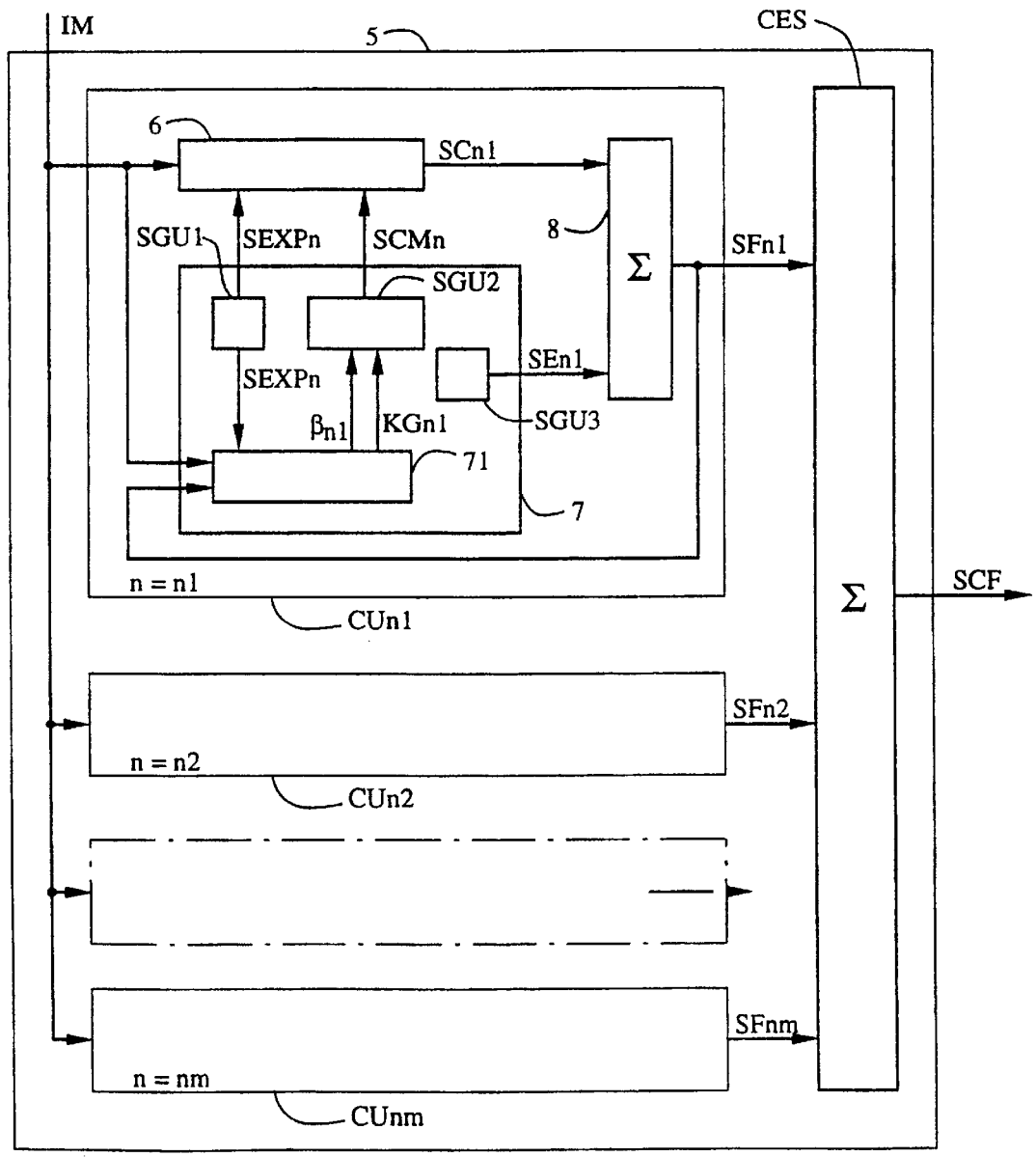
FIG. 5 shows, in the form of a block diagram, an embodiment of control equipment for the active filter in an installation according to FIG. 2, FIGS. 6A-6B show, in the form of an explanatory block diagram, an embodiment of a control unit according to the invention for reduction of a harmonic.

FIG. 5 shows in the form of a block diagram an embodiment of the control equipment 5 according to the invention. The control equipment comprises at least one, and generally a number of, control units CUn, designated CUn1, CUn2, . . . , CUnm in the figure, each one for reduction of a tone Idn of the tone/frequency nω among the ac components of the direct current. Each of the control units has a similar composition, which will be described in greater detail below, and the control unit CUn1 is adapted to damp a tone for which the ordinal number n=n1, the control unit CUn2 is adapted to damp a tone for which the ordinal number n=n2, and the control unit CUnm is adapted to damp a tone for which the ordinal number n=nm. Each one of the control units is supplied with the current measurement value IM, corresponding to the ac component Idh(t) of the current Id, and generates an influencing signal SFn, in the figure designated SFn1, SFn2, . . . , SFnm, respectively.

The control unit CUn1 comprises a controlling unit 6, which is supplied with the current measurement value IM and generates a control signal SCn1. According to the invention, the controlling unit comprises, in addition thereto, identification equipment 7. This identification equipment, which will be described in greater detail below, comprises a signal-generating member SGU3, which generates an excitation signal SEn1, an identification unit 71 as well as two signal-generating members SGU1 and SGU2. Further, the control unit comprises a summing member 8, which forms the influencing signal SFn1 in dependence on a sum of the control signal SCn1 and the excitation signal SEn1.

In this embodiment of the invention, the identification unit is supplied with a first identification signal in the form of the current measurement value IM and with a second identification signal in the form of the influencing signal SFn1 and forms, in a manner to be described below, in dependence on the mentioned identification signals, at least one first compensating parameter and supplies this compensating parameter to the controlling unit.

In similar manner, the control units CUn2, . . . , CUnm form control signals SCn2, . . . , SCnm (not shown in the figure) which are supplied to summing members corresponding to the summing member 8 shown for the control unit CUn1. Influencing signals SFn2, . . . , SFnm from the control units CUn2, . . . , CUnm are each supplied to a summing member CES comprised in the control equipment, the output signal of this summing member in this case thus constituting the control order SCF. Thus, in this case, the control order is formed in dependence on a sum of control signals from a number of parallel-connected controlling units for tones for which n=n1, n2, . . . , nm, thus obtaining a simultaneous reduction of the amplitude for a number of tones Idn.

In this embodiment of the invention, each one of the control units comprises a piece of identification equipment of a kind similar to that described in connection with the control unit CUn1, the present excitation signal also being added to the control order. In the event that the control equipment is designed to comprise only one control unit for damping of one single tone, the summing member CES may, of course, be omitted and the control order SCF in this case consist of the influencing signal SFn.

Figure 6A:
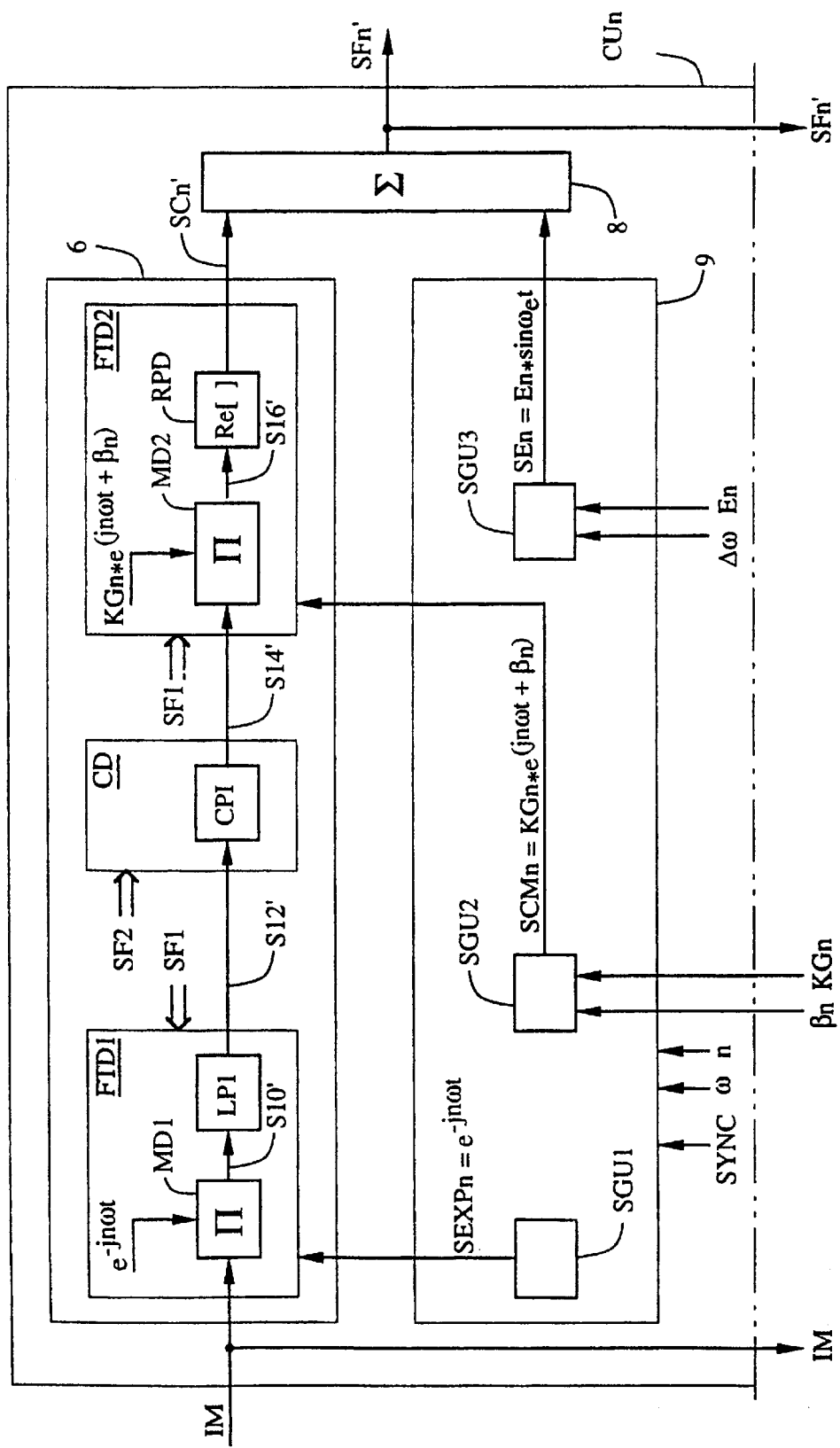

FIG. 6A shows an embodiment of a controlling unit 6, the signal-generating members SGU1, SGU2 and SGU3 included in the identification equipment, and the summing member 8. The shown parts of the control equipment are illustrated, in principle, by means of a signal processing in complex quantities for a tone of the ordinal number n.

The controlling unit comprises a first frequency-transforming member FTD1, a controlling member CD and a second frequency-transforming member FTD2. The signal-generating member SGU1 generates, in dependence on supplied values of n and ω, a calculating signal SEXP= $e^{-jn\omega t}$. The signal-generating member SGU2 generates, in dependence on supplied values of n and ω as well as at least one first compensating parameter $\beta_n$, and in a further development of the invention also in dependence on a value of a second compensating parameter KGn, which compensating parameters will be described in greater detail below, a compensating signal SCMn=KGn* $e^{j(n\omega t+\beta n)}$.

Using the known mathematical relationships $$e^{j\phi} = \cos\phi + j\sin\phi \qquad (3)$$

and $$\sin\phi = (½j)*\{e^{j\phi}-e^{-j\phi}\}, \quad \cos\phi = (½)*\{e^{j\phi}+e^{-j\phi}\}, \qquad (4)$$

the current value IM may be written as $$IM = \sum_{k=1}^{\infty} (Ak/2j) * \{e^{j[k\omega t+\alpha_k]} - e^{-j[k\omega t+\alpha_k]}\} \qquad (5)$$

The current measurement value IM and the calculating signal SEXPn= $e^{-jnwt}$ are supplied to a multiplying member MD1, comprised in the first frequency-transforming member, which forms an output signal S10' of the form $$S10' = IM * e^{-jn\omega t} = \sum_{k=1}^{\infty} (Ak/2j) * \{e^{j[(k-n)\omega t+\alpha_k]} - e^{-j[(k+n)\omega t+\alpha_k]}\} \qquad (6)$$

Of the form of the expression (6) it is realized that the output signal S10' contains, on the one hand, a component of the frequency zero and a component of the frequency 2nω, both corresponding to k=n, and, on the other hand, components of the frequencies (k−n)ω and (k+n)ω, corresponding to k≠n.

The output signal S10' is supplied to a filter member LP1, which as output signal S12' forms a first filter signal. The filter member LP1 has a transfer function of low-pass character, which is assumed to be so chosen that the filter member from the supplied signal essentially eliminates the component of the frequency 2nω, and, for k≠n, the components of the frequencies (k−n)ω and (k+n)ω.

For the subsequent signal processing, thus, only the above-mentioned term of the frequency zero is considered, and therefore the output signal S12', the first filter signal, from the filter member LP1 may be written as $$S12' = (A_n/2j)e^{j\alpha_n} \qquad (7)$$

As is clear from the expression (7), by the formation of the signal S12' in the first frequency-transforming member, a transformation has been achieved, for the nth tone Idn in the current measurement value IM, in the frequency plane from the tone frequency nω to the frequency zero. Further, apart from a factor 0.5, a division of the amplitude An and the phase angle $\alpha_n$ of this tone into two polar components in the complex number plane has been achieved.

Both the amplitude An and the phase angle $\alpha_n$ may vary as a function of time but are considered formally as constants in the following calculations.

The signal S12' is supplied to the controlling member CD, the transfer function of which comprises a term of the form $$HC(s) = \frac{Kp}{Ti} * \frac{1+sTi}{s} \qquad (8)$$

that is, the controlling member has a proportional/integrating characteristic.

The controlling member forms as output signal a controller signal S14', which together with the compensating signal SCMn=KGn*$e^{j(n\omega t+\beta n)}$ is supplied to a multiplying member MD2 comprised in the second frequency-transforming member, the output signal S16' of the member MD2, which thus in this presentation is a complex quantity, being supplied to a real-value forming member RPD. The real-value forming member forwards, in some manner known per se, as output signal a control signal SCn' which comprises the real component of the supplied complex signal but not its imaginary component. Thus, for the output signal SCn', the following applies $$SCn'=Re\{(A_n/2j)e^{j\alpha n}*HC(0)*KGn*e^{j(n\omega t+\beta n)}\} \qquad (9)$$

where the designation HC(0) is to be understood as a way of designating the amplitude amplification and phase shift of the transfer function HC(s) of the controlling member at the frequency zero (corresponding to an influence with respect to the time of the input signal of the controlling member).

Simplification of the expression (9) gives the following $$SCn'=(A_n/2)*HC(0)*KGn*\sin(n\omega t+\alpha_n+\beta_n) \qquad (10)$$

As described above with reference to FIG. 5, in this embodiment of the invention, the control signal is supplied to a summing member 8, whereby the control order SCF is formed in dependence on the output signal of this member, designated as the influencing signal SFn.

For the sake of simplicity, the description of the invention, according to which the identification equipment forms at least the first compensating parameter, will be made in the following in the context of the improvement of the invention according to which the identification equipment forms also the second compensating parameter. In the event that the identification equipment forms only the first compensating parameter, the value of the second compensating parameter will, in the following, be set at a constant value KGn=−1.

According to the invention and the improvement thereof, the first and second compensating parameters, $\beta_n$ and KGn, respectively, in the compensating signal SCMn=KGn*$e^{j(n\omega t+\beta n)}$ are given values formed in the above-mentioned identification unit 71 in the manner described in the following.

In principle, the transfer function HI(s) from the control signal SCn' generated by the controlling unit to the ac component Idh of the current in the dc connection for a chosen tone frequency is determined as an amplitude amplification HIAn and a phase shift HIPHn, whereupon the following values are applied to the above-mentioned compensating parameters $$KGn=-1/HIAn \qquad (11)$$

$$\beta_n=-HIPHn \qquad (12)$$

As is clear from the expression (10), the control signal SCn' from the controlling unit is in this way formed in dependence on the characteristic of the controlling member and compensated for the amplitude amplification and phase shift of the transfer function HI(s) at the tone frequency nω.

It has been found that a compensation of the kind described makes possible a setting of the proportionality amplification Kp and the integration interval constant Ti of the controlling member, which leads to better performance as regards the reduction of the tone or tones chosen without the stability of the system being jeopardized. In particular these advantages are obtained by determining the value of the first compensating parameter $\beta_n$ such that the expression (12) is fulfilled. By the improvement of the invention, according to which the value of the second compensating parameter is determined such that the expression (11) is fulfilled, advantages are also obtained in particular in the event that a plurality of controllers, each one for a certain tone, are parallel-connected as described above with reference to FIG. 5, in that all the controllers in this way may be given the same characteristic as regards the proportional and integrating function.

Figure 6B:
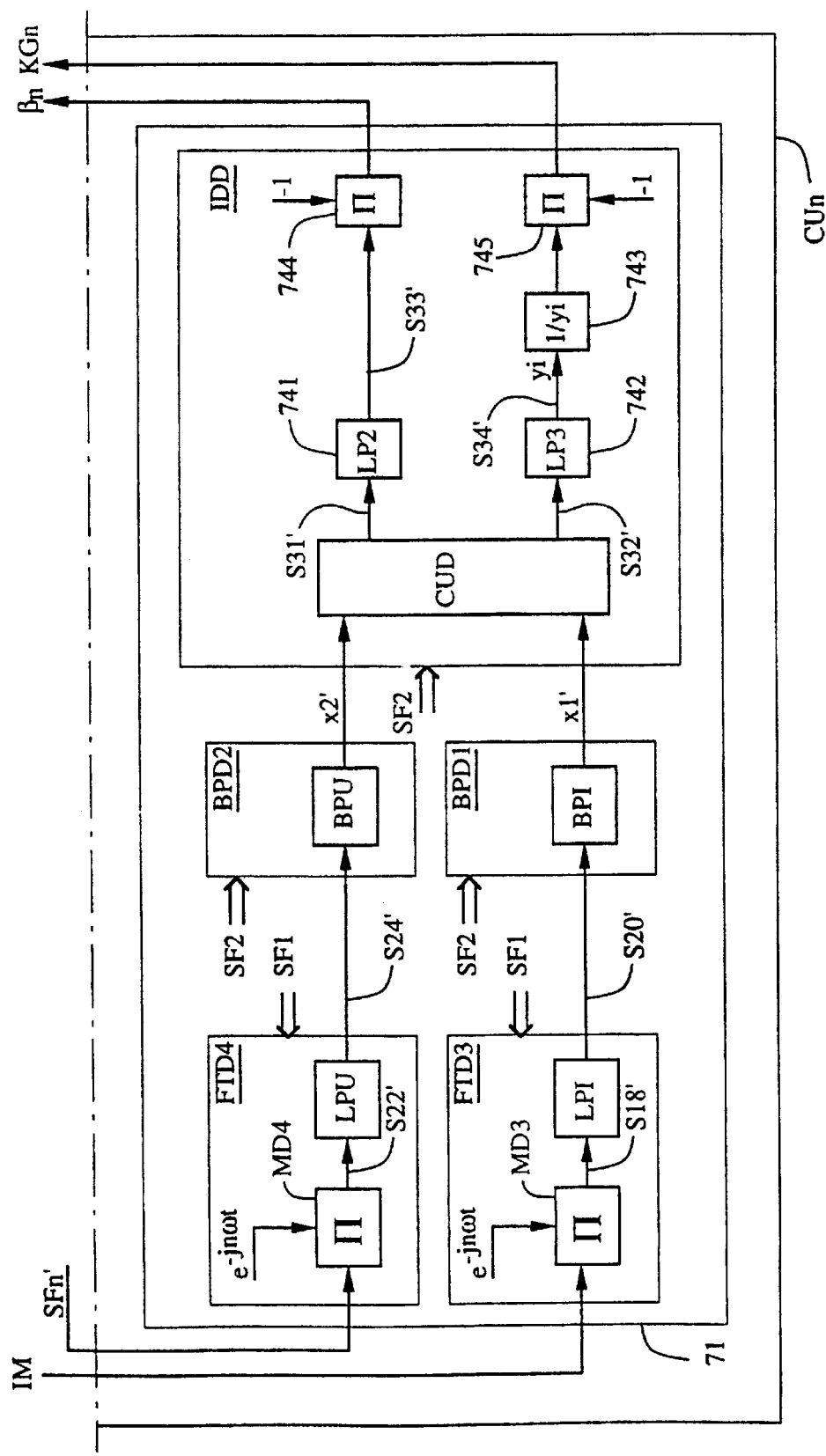

FIG. 6B shows an embodiment of an identification unit 71 according to the invention, which in this figure is illustrated in fundamental form by means of a signal processing in complex quantities for a tone of the ordinal number n.

The identification unit comprises, in this embodiment of the invention, a first identification member, which comprises a third frequency-transforming member FTD3 and a first bandpass-filtering member BPD1, a second identification member, which comprises a fourth frequency-transforming member FTD4 and a second bandpass-filtering member BPD2, as well as a third identification member IDD.

In this embodiment of the invention, each one of the third and fourth frequency-transforming members comprises a multiplying member MD3, MD4 respectively, and a filter member PI, LPU respectively, with transfer functions of low-pass character.

As illustrated in FIG. 6A the identification equipment comprises a signal-generating member SGU3, which, in this embodiment of the invention, generates an excitation signal SEn with an excitation frequency $\omega_e$ and which is of the form $$SEn=En*\sin(\omega_e t) \qquad (13)$$

The excitation signal is supplied to the summing member 8, which thus, as output signal, forms the influencing signal SFn' besides in dependence on the control signal SCn' also in dependence on the excitation signal SEn, which means that the excitation signal is added to the control order.

Because of the excitation signal SEn supplied to the installation, in this case the current measurement value IM from the current measuring device 4 will also specifically contain a component Ie=Ae*sin($\omega_e$t+γe) of the excitation frequency $\omega_e$ and with the phase position γe relative to the zero crossing of the voltage in the chosen phase of the alternating-voltage network N1.

A first identification signal, in this embodiment of the invention the current measurement value IM, and the calculating signal SEXPn=$e^{-jn\omega t}$, is supplied to the multiplying member MD3, the output signal of which is designated S18'. Specifically, this output signal S18' will contain a term which, by analogy with the expression (6), in complex form may be written as $$I'e=(Ae/2j)*\{e^{j[(\omega_e-n\omega)t+\gamma e]}-e^{-j[(\omega_e+n\omega)t+\gamma e]}\} \qquad (14)$$

From the form of the expression (14), it is realized that the term I' contains, on the one hand, a component of the difference frequency ($\omega_e-n\omega$) between the excitation frequency $\omega_e$ and the chosen tone frequency nω, and, on the other hand, a component of the sum frequency ($\omega_e+n\omega$) of these frequencies.

The output signal S18' from the multiplying member MD3 is supplied to the filter member LP1, the transfer function of which is advantageously chosen such that the filter member, from the signal supplied thereto, essentially eliminates the components of frequencies higher than the difference frequency ($\omega_e-n\omega$).

The output signal S20' from the filter member LPI, which is also the output signal from the third frequency-transforming member, is supplied to the first bandpass-filtering member BPD1, which has a transfer function which, of the signals supplied thereto, lets through the component of the difference frequency ($\omega_e-n\omega$) but suppresses components of other frequencies. The first bandpass-filtering member forms as output signal x1' a second filter signal, which thus, for the continued signal processing, is assumed to have the form $$x1'=(Ae/2j)*e^{j[(\omega_e-n\omega)t+\gamma_e]} \quad (15)$$

With the control signal SCn' according to the expression (10), the influencing signal SFn' will in this case have the form $$SFn'=ASCn'*\sin(n\omega t+\alpha_n+\beta_n)+En*\sin(\omega_e t) \quad (16)$$

where $ASCn'=(A_n/2)*HC(0)*KGn$

A second identification signal, in this embodiment of the invention the control signal SFn', and the calculating signal $SEXPn=e^{-jn\omega t}$ are supplied to the multiplying member MD4, the output signal of which is designated S22'. Specifically, this output signal S22', in a manner analogous to that shown at the expression (14), will comprise, on the one hand, a component of the difference frequency ($\omega_e-n\omega$) between the excitation frequency $\omega_e$ and the tone frequency $n\omega$ chosen, and, on the other hand, a component of the sum frequency ($\omega_e+n\omega$) of these frequencies. The output signal S22' from the multiplying member MD4 is supplied to a filter member LPU, which is of the same kind as the filter member LPI.

The output signal S24' from the filter member LPU, which is also the output signal from the fourth frequency-transforming member, is supplied to the second bandpass-filtering member BPD2, which is of the same kind as the first bandpass-filtering member BPD1.

The second bandpass-filtering member forms as output signal x2' a third filter signal, which thus, for the continued signal processing, is assumed to have the form $$x2'=(En/2j)*e^{j(\omega_e-n\omega)t} \quad (17)$$

The influencing signal SFn' from the summing member 8 is formed as the sum of the control signal SCn' from the controlling unit 6 and the excitation signal SEn from the identification equipment 7 without any amplitude amplification or mutual phase change. From this it is realized that the transfer function HI(s) from the control signal SCn' to the current measurement value IM, supplied to the controlling unit 6, of the ac component Idh(t) of the current in the dc connection also, at least approximately, and then in particular for the tones whose tone frequencies are near the chosen excitation frequency, is that transfer function which applies from the excitation signal SEn to the measured value, supplied to the identification equipment 7, of the same ac component. From this and from the expressions (16) and (18) it follows that the ratio x1'/x2' constitutes a calculating value of the transfer function HI(s) at the excitation frequency $\omega_e$, that is to say $$HI(j\omega_e)=x1'/x2=(Ae/En)*e^{j\gamma_e} \quad (18)$$

where the expression $HI(j\omega_e)$ is to be understood as a way of designating the amplitude amplification and phase shift (corresponding to an influence with respect to time) of the transfer function HI(s) at the excitation frequency $\omega_e$.

The second and third filter signals x1' and x2', respectively, are supplied to the third identification member IDD, which in this embodiment of the invention comprises a calculating member CUD, which in some way known per se forms and produces as output signal a calculating value S31' of the angle $\gamma_e$=HIPHn and a calculating value S32' of the ratio (Ae/En)=HIAn. The calculating values S31' and S32' are each separately supplied to a low-pass filter 741, 742, respectively, the switching frequencies of which are preferably chosen to be of the same order of magnitude as the difference frequency ($\omega_e-n\omega$). The output signal S33' from the low-pass filter 741 is supplied to a multiplying member 744 and is there multiplied by the factor −ONE and the output signal S34' from the low-pass filter 742 is supplied to a quotient-forming member 743, the output signal of which consists of the inverted value of its input signal. The output signal from the quotient-forming member is supplied to a multiplying member 745 and is there multiplied by the factor −ONE.

The output signal from the multiplying member 744 thus constitutes a value $\beta_n=-\gamma_e$ of the first compensating parameter and the output signal from the multiplying member 745 constitutes a value $KGn=-En/Ae=-1/HIAn$ of the second compensating parameter. These compensating parameters are supplied to the signal-generating member SGU2 as described above.

The excitation frequency $\omega_e$ may preferably be chosen to be at a chosen distance from the tone $n\omega$, that is $$\omega_e=n\omega+\Delta\omega \quad (19)$$

In the embodiment of the control equipment shown in FIG. 5, each one of the control units CUn comprises a controlling unit 6, a piece of identification equipment 7 and signal-generating members SGU1, SGU2 and SGU3 of the kind described above. The signal-generating member SGU1 in the control unit CUn1 forms a calculating signal $SEXPn=e^{-jn\omega t}$ with n=n1, the signal-generating member SGU1 in the control unit CUn2 a calculating signal $SEXPn=e^{-jn\omega t}$ with n=n2 and so on. In a corresponding way, the respective signal-generating member SGU2 generates compensating signals SCMn for respectively n=n1, n=n2 and so on.

Figure 7:
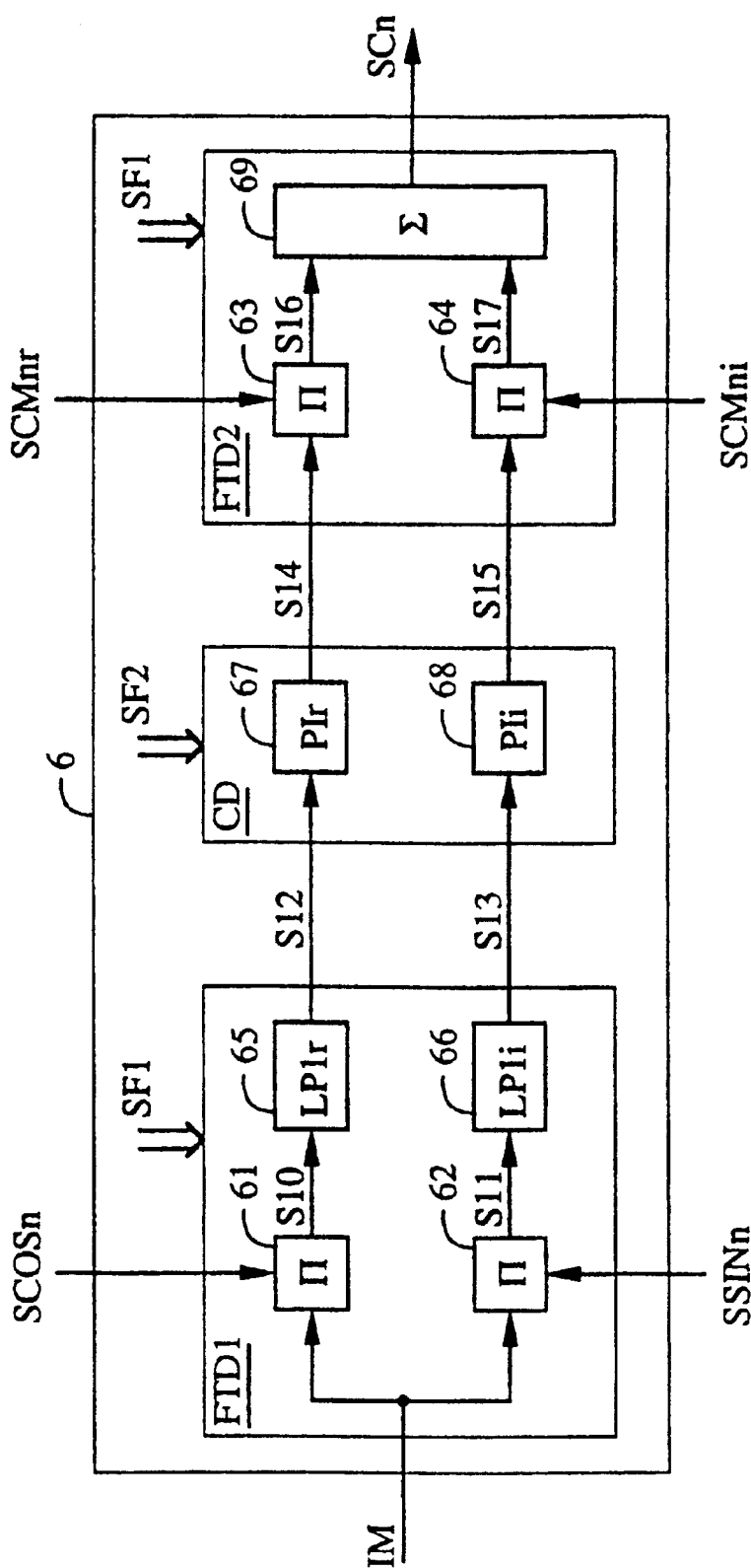
FIG. 7 shows, in the form of a block diagram, an embodiment of a controlling unit comprised in a control unit according to FIG. 6A.

FIG. 7 shows in the form of a block diagram an embodiment of a controlling unit according to the invention as described above with reference to FIG. 6A. The first frequency-transforming member comprises multiplying members 61, 62 and low-pass filters 65, 66. The controlling member CD comprises controllers 67, 68 and the second frequency-transforming member comprises multiplying members 63, 64 as well as a summing member 69.

The controlling unit is supplied with the current measurement value IM from the current measuring device 4, calculating signals SCOSn, SSINn and compensating signals SCMnr and SCMni, which will be explained in greater detail below, and forms, in dependence on these signals, as output signal a control signal SCn.

The calculating signals SCOSn, SSINn and the compensating signals SCMnr and SCMni are of the form $$SCOSn=\cos(n\omega t) \quad (20)$$

$$SSINn=-\sin(n\omega t) \quad (21)$$

$$SCMnr=KGn*\cos(n\omega t+\beta_n) \quad (22)$$

$$SCMni=-KGn*\sin(n\omega t+\beta_n) \quad (23)$$

The multiplying member 61 is supplied with the signals IM and SCOSn and forms the output signal S10. The multiplying member 62 is supplied with the signals IM and SSINn and forms the output signal S11. With the measured value IM according to the expression (1') and while using known trigonometric relationships, the following is obtained $$S10 = \sum_{k=1}^{\infty} (Ak/2) * \{\sin[(k-n)\omega t + \alpha_k] + \sin[(k+n)\omega t + \alpha_k]\} \quad (24)$$

where the included term $Ak/2*\sin(\alpha_k)$ of the frequency zero corresponds to k=n.

In similar manner the following is obtained $$S11 = \sum_{k=1}^{\infty} -(Ak/2) * \{\cos[(k-n)t + \alpha_k] - \cos[(k+n)\omega t + \alpha_k]\} \quad (25)$$

where the included term $(-Ak/2)*\cos(\alpha_k)$ of the frequency zero corresponds to k=n.

The signals S10 and S11 are supplied to the low-pass filters 65 and 66, respectively. Each of these has a transfer function of the same kind as the filter member LP1 described above with reference to FIG. 6A.

For the continued signal processing, thus only the terms of the frequency zero are considered in the output signals from the low-pass filters 65 and 66, and therefore the output signal S12 from the low-pass filter 65, which is supplied to the controller 67, may be written as $$S12 = \frac{An}{2}\sin(\alpha_n) \quad (26)$$

and the output signal S13 from the low-pass filter 66, which is supplied to the controller 68, may, therefore, approximately be written as $$S13 = -An/2 \cos(\alpha_n) \quad (27)$$

The above-mentioned first filter signal comprises in this case two components, the output signals S12 and S13.

As is clear from the expressions (26) and (27), by the formation of the signals S12 and S13 in the first frequency-transforming member, for the nth tone in the current measurement value IM, a transformation has been achieved in the frequency plane from the tone frequency nω to the frequency zero. Further, apart from a factor 0.5, a division of the amplitude An of this tone into two orthogonal components has been achieved.

The controllers 67 and 68 each have a transfer function HC(s), which comprises a term of the form $$HC(s) = \frac{Kp}{Ti} * \frac{1+sTi}{s} \quad (28)$$

that is, a proportional/integrating characteristic.

The output signal S14 from the controller 67 may thus be written as $$S14 = HC(0) * \frac{An}{2}\sin(\alpha_n) \quad (29)$$

and the output signal S15 from the controller 68 as $$S15 = -HC(0) * \frac{An}{2}\cos(\alpha_n) \quad (30)$$

where the designation HC (0) is to be understood in the same way as in the expression (9).

The above-mentioned controller signal in this case comprises two components, the output signals S14 and S15.

The multiplying member 63 is supplied with the signals S14 and SCMnr=KGn*cos(nωt+$\beta_n$) and forms the output signal S16. The multiplying member 64 is supplied with the signals S15 and SCMni=-KGn*sin(nωt+$\beta_n$) and forms the output signal S17.

The signals S16 and S17 which are supplied to the summing ember 69, may then be written as $$S16 = HC(0) * KGn * \frac{An}{2}\sin(\alpha_n) * \cos(n\omega t + \beta_n) \quad (31)$$

$$S17 = HC(0) * KGn * \frac{An}{2}\cos(\alpha_n) * \sin(n\omega t + \beta_n) \quad (32)$$

The summing member forms as output signal a control signal SCn=S16+S17 which, with known trigonometric relationships, may be written as $$SCn = HC(0)*KGn*An*\sin(n\omega t + \beta_n + \alpha_n) \quad (33)$$

According to the invention and the improvement thereof, in principle in the same way as described above with reference to FIG. 5, the compensating parameters KGn and $\beta_n$ in the compensating signals SCMnr and SCMni according to the expressions (22) and (23) are given the values formed in the manner described in the following. The expression (33) shows that the output signal SCn in this way is formed in dependence on the characteristic of the controllers with compensation for the amplitude amplification and phase shift of the above-mentioned transfer function HI(s) at the tone frequency nω.

Figure 9:
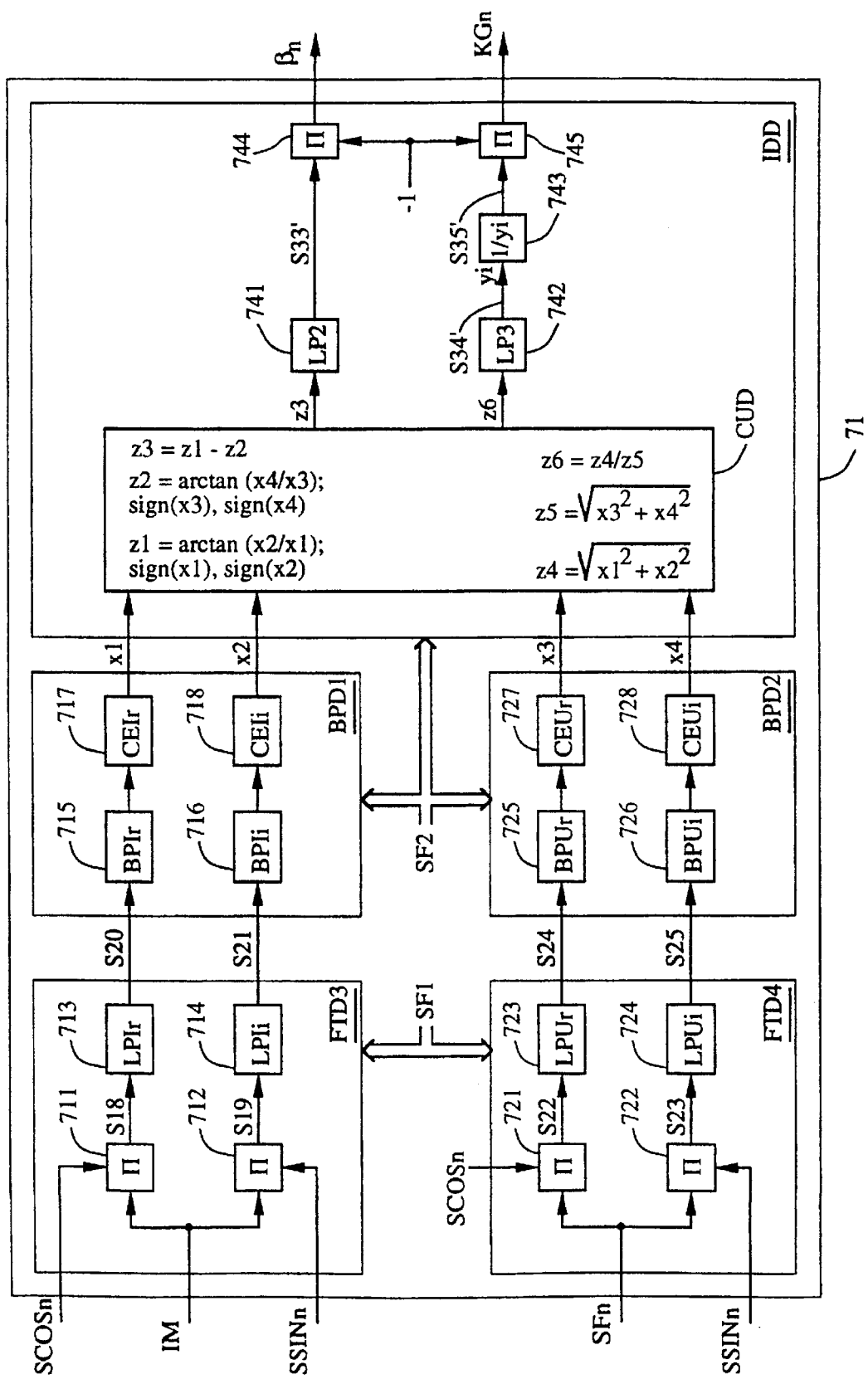
FIG. 9 shows, in the form of a block diagram, an embodiment of a setting unit comprised in a control unit according to FIG. 6B.

FIG. 9 shows in the form of a block diagram an embodiment of an identification unit 71 according to the invention, comprised in the control unit CUn, of, in principle, the same kind as the one described above with reference to FIG. 6B. The third frequency-transforming member comprises multiplying members 711, 712 and low-pass filters 713, 714. The fourth frequency-transforming member comprises multiplying members 721, 722 and low-pass filters 723, 724. The first bandpass-filtering members BPD1 comprises bandpass filters 715, 716 and difference-forming members 717, 718. The second bandpass-filtering member BPD2 comprises bandpass filters 725, 726 and difference-forming members 727, 728. The third identification member IDD comprises members corresponding to those described above with reference to FIG. 6B; however, in this embodiment the calculating member CUD is adapted to carry out calculations which will be described in detail below. The identification unit is supplied with the current measurement value IM from the current measuring device 4, the influencing signal SFn from the control unit and the calculating signals SCOSn and SSINn and forms, in dependence on supplied signals, values of the first and, according to the improvement of the invention, also the second compensating parameter.

In a manner similar to that described with reference to FIGS. 5 and 6B, in this embodiment of the invention, the influencing signal SFn is formed, besides in dependence on the control signal SCn, also in dependence on an excitation signal SEn of the form stated in the expression (13) and the current measurement value IM will hence, in the same way as described above, specifically contain a component Ie=Ae*sin($\omega_e$t+γe) of the excitation frequency $\omega_e$ and with the phase position γe relative to the zero crossing for the voltage in the chosen phase of the alternating-voltage network N1.

The multiplying member 711 is supplied with the signals IM and SCOSn and forms the output signal S18. The multiplying member 712 is supplied with the signals IM and SSINn, and forms output signal S19.

By analogy with the expression (14), the output signal S18 will specifically comprise a term of the form $$Iec = \frac{Ae}{2}\{\sin[(\omega_e - n\omega)t + \gamma_e] + \sin[(\omega_e + n\omega)t + \gamma_e]\} \quad (34)$$

and the output signal S19 will comprise a term of the form $$Ies = -\frac{Ae}{2}\{\cos[(\omega_e - n\omega)t + \gamma_e] - \cos[(\omega_e + n\omega)t + \gamma]\} \quad (35)$$

The signals S18 and S19 are supplied to the low-pass filters 713 and 714, respectively. These are given transfer functions which are advantageously chosen such that, from the supplied signals, they essentially eliminate the components of frequencies higher than the difference frequency ($\omega_e$–n$\omega$).

The output signal S20 from the low-pass filter 713 is supplied to the bandpass filter 715, and the output signal 714 is supplied to the bandpass filter 716.

The bandpass filters 715, 716 have a characteristic which, of the supplied signals, essentially lets through the component of the difference frequency ($\omega_e$–n$\omega$) but suppresses components of other frequencies and their output signals are each supplied to a respective one of the difference-forming members 717, 718 respectively. The difference-forming members form as output signals x1, x2, respectively, the difference between the input signals at a time t1 and at a time t2=t1–2π/ω, the effect of which is that, in the signals x1 and x2, specifically all frequencies of the form nω are eliminated.

For the continued signal processing, it is thus assumed that the signals x1 and x2, respectively, are of the form $$x1 = \frac{Ae}{2}\{\sin[(\omega_e - n\omega)t + \gamma_e]\} \quad (36)$$

$$x2 = -\frac{Ae}{2}\{\cos[(\omega_e - n\omega)t + \gamma_e]\} \quad (37)$$

The signals x1 and x2 form a first and a second component of the above-mentioned second filter signal, which components together contain information about the amplitude and phase position Ae and γe, respectively, of the current measurement value for the excitation frequency.

The low-pass filters 723, 724 and the bandpass filters 725, 726, respectively, are of the same kind as the corresponding filters in the third frequency-transforming member and in the first bandpass-filtering member, respectively, and the influencing signal SFn from the control unit CUn is processed, in a manner analogous to that described above, in the multiplying members 721, 722, the low-pass filters 723, 724, the bandpass filters 725, 726 and the difference-forming members 727, 728. The output signals x3 and x4, respectively, from the last-mentioned members may thus be written as $$x3 = \frac{En}{2}\sin(\omega_e - n\omega)t \quad (38)$$

$$x4 = -\frac{En}{2}\cos(\omega_e - n\omega)t \quad (39)$$

The signals x3 and x4 form a first and a second component of the above-mentioned third filter signal, which components together contain information about the amplitude En of the excitation signal.

The signals x1, x2, x3, x4 are supplied to the calculating member CUD, which in a manner known per se is adapted to form as output signals z3 and z6

$$z3 = \arctan(x2/x1) - \arctan(x4/x3) \quad (40)$$

and $$z6 = z4/z5 = \sqrt{x1^2 + x2^2}/\sqrt{x3^2 + x4^2} \quad (41)$$

In FIG. 9, the designations sign (x1), sign (x2), sign (x3) and sign (x4) denote that the calculating member CUD is adapted to add to the principle value of the arc tan functions, which value by definition lies between –90° and +90°, while correctly considering the sign of the signals x1, x2, x3 and x4, where appropriate, an angle of 180°.

Inserting the expressions (36)–(39) in the expression (40)-(41), while using known trigonometric expressions, gives $$z3 = \gamma_n \quad (42)$$

$$z6 = Ae/En \quad (43)$$

For the same reasons as described above with reference to FIGS. 6A, 6B it is realized that the transfer function HI(s) from the control signal SCn to the current measurement value IM, supplied to the controlling unit 6, of the ac component Idh(t) of the current in the dc connection also at least approximately is that transfer function which applies from the excitation signal SEn to the measured value of the same ac component supplied to the identification unit 71.

From this and from the expressions (42) and (43) it follows that the calculating value z6=Ae/En constitutes a calculating value of the amplitude amplification HIAn in the transfer function HI(s) at the excitation frequency $\omega_e$, and that the calculating value z3=$\gamma_n$ constitutes a calculating value of the phase shift HIPHn of this transfer function, likewise at the excitation frequency $\omega_e$.

The calculating values z3 and z6 are each one supplied to a low-pass filter 741, 742, respectively, the switching frequencies of which are preferably chosen to be of the same order of magnitude as the difference frequency ($\omega_e$–n$\omega$). The output signals S33' and S34' from the latter low-pass filters are processed in the same way as described above with reference to FIG. 6B and the compensating parameter values $\beta_n$ and KGn are supplied to the controlling unit in the same way as described above with reference to FIG. 7.

The control order is formed in dependence on the control signal SCn, formed by the controlling unit, which in turn in formed in dependence on a current component in the dc connection with the tone frequency nω. It is further realized that since the control signal according to expression (34), by the compensating parameter value KGn being set at KGn=–HIAn, has reversed signs in relation to the tone Idn, the voltage UF (FIG. 1), generated by the active filter, in the series connection of the passive impedance unit and the active filter will generate a current IF which, at the switching time J1, is added to the current Id in such a way that the tone Idn=An*sin(nωt+α$_n$) in its ac component is at least reduced in amplitude and in principle, by the integrating function of the controllers, may be completely eliminated.

Figure 11:
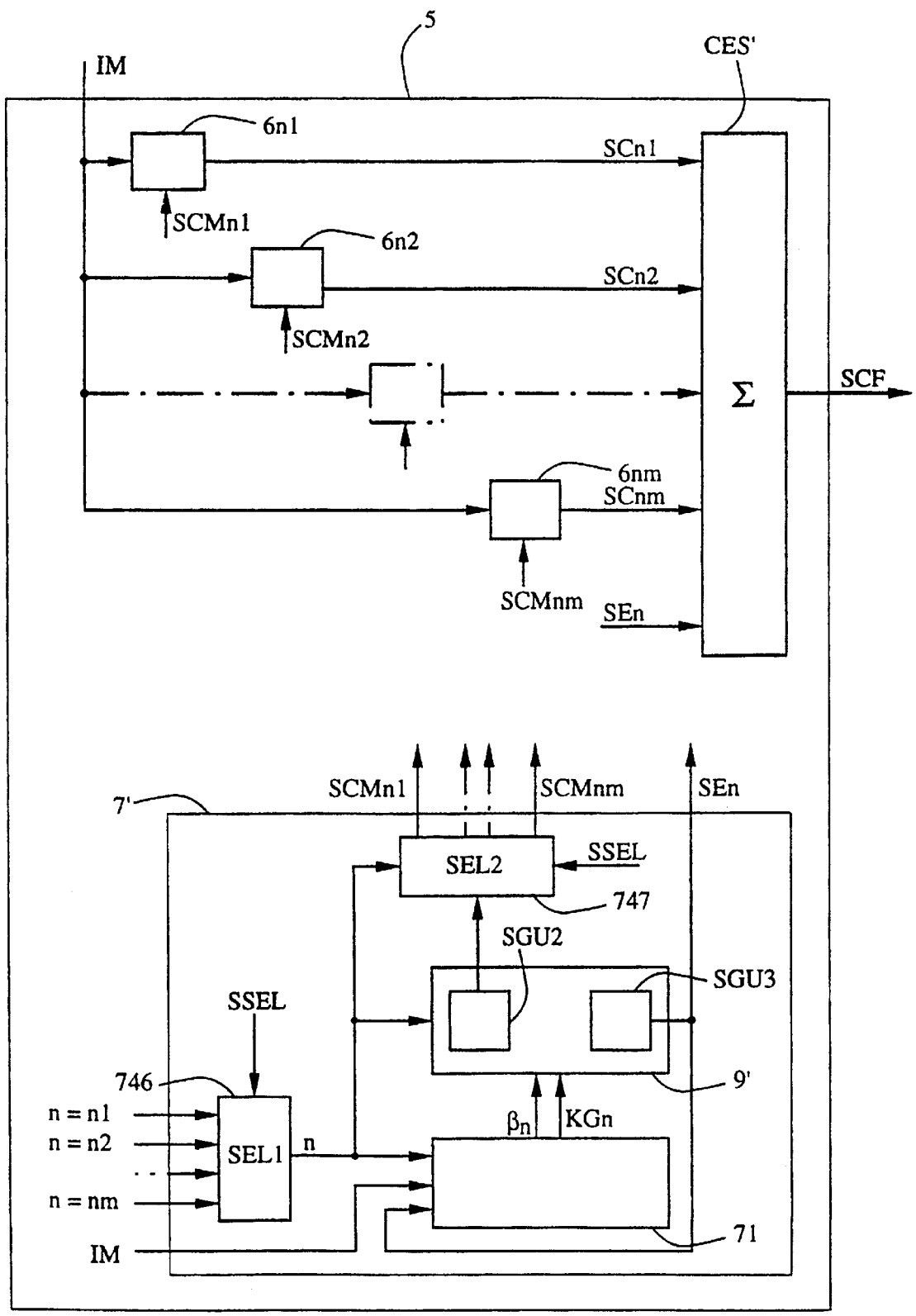
FIG. 11 shows, in the form of a block diagram, an additional embodiment of control equipment for the active filter in an installation according to FIG. 2.

FIG. 11 shows in the form of a block diagram another embodiment of the control equipment 5 for the active filter, advantageous for those cases where the control equipment comprises a number of parallel-connected controlling units 6n1, 6n2, . . . , 6nm for tones for which the ordinal number n=n1, 2, . . . , nm, and for which controlling units values of the compensating parameters βn and KGn, respectively, are determined by identification equipment 7' common to all controlling units.

The identification equipment 7' comprises, in addition to an identification unit 71 and signal-generating members SGU2 and SGU3 of the above-mentioned kind, two selector members 746 and 747. The selector member 746 is supplied with the chosen ordinal numbers n1, n2, . . . nm and forwards, in some manner known per se, in dependence on a tone selection order SSEL supplied to it, the ordinal number (in the figure marked 'n') for that tone for which the identification is to be carried out to the identification unit 71, to the signal-generating member SGU2 and to the selector member 747. The identification unit 71 is also supplied with the current measurement value IM and the excitation signal SEn and generates, in the manner described above, values of the compensating parameters β$_n$ and KGn for the chosen tone. These respective values are supplied to the selector member 747, which also in dependence on the ordinal number n, in some manner known per se, in dependence on the tone selection order, supplies to the respective controlling unit values of the respective compensating parameters which are applicable to the controlling unit in question, in the figure, for the same of clarity, only marked with the complex compensating signals SCMn1, . . . , SCMnm.

The excitation signal SEn=En*sin(ω$_e$t) is in this case supplied to a summing member CES', which is also supplied with the control signals SCn from the respective controlling unit and forms the control order SCF in dependence on these supplied signals. Contrary to the device described with reference to FIG. 5, where the identification was carried out on the transfer function from the influencing signal SFn, generated by the control unit, to the ac component Idh(t) of the current in the dc connection, in this case, as illustrated in FIG. 11, the identification is carried out on the transfer function from the excitation signal SEn, generated by the identification unit, to the mentioned ac component. Since, as described above, also in this case the respective signals are summed in summing members without any amplitude amplification or mutual phase change, it is realized that also in this case the identified values of the compensating parameters βn and KGn, respectively, are valid for the transfer function HI(s) from the control signal SCn formed by the controlling unit to the measured value, supplied to the controlling unit, of the mentioned ac component.

Figure 8:
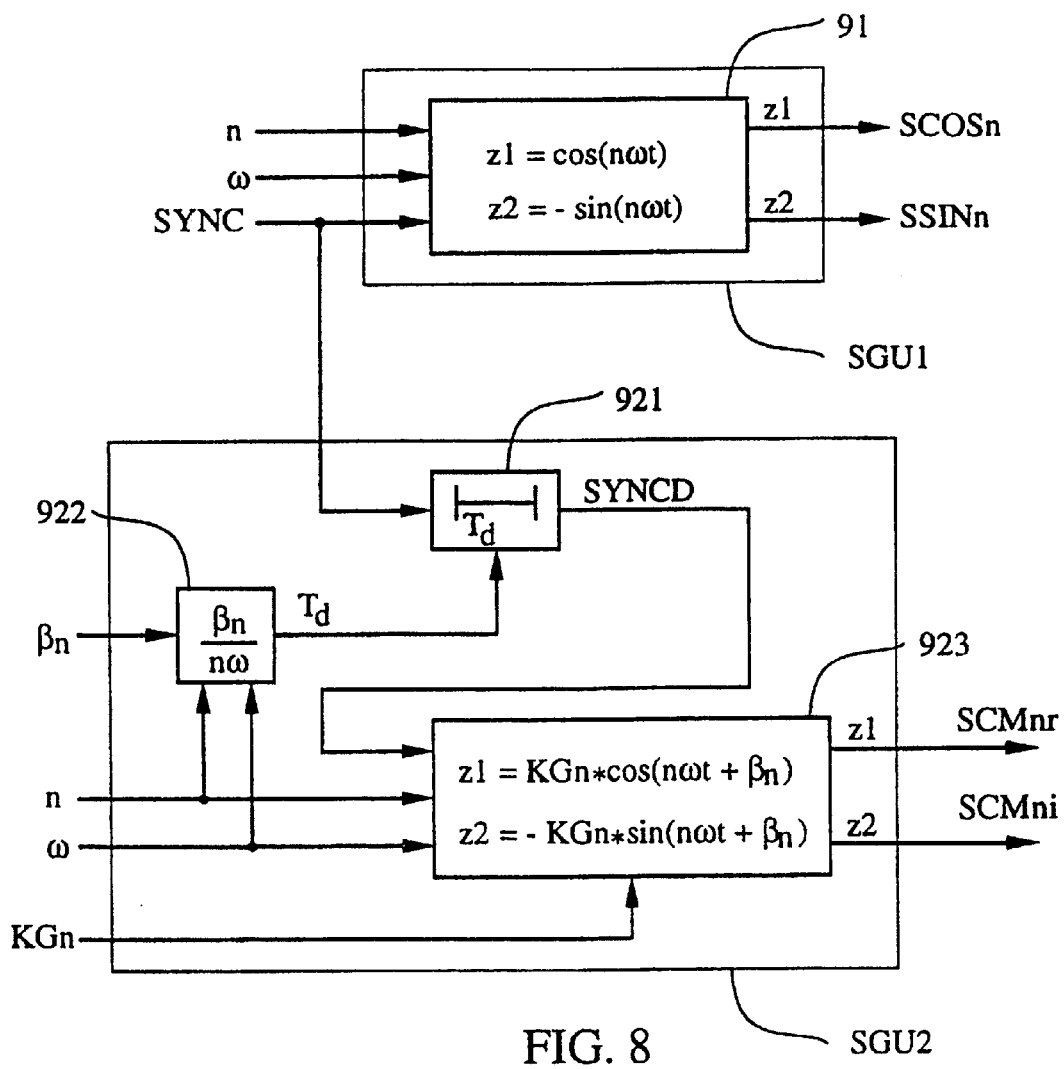
FIG. 8 shows, in the form of a block diagram, the generation of calculating and compensating signals for a controlling unit according to FIG. 7.

FIG. 8 schematically show embodiments of signal-generating members SGU1, SGU2 comprised in the control equipment. The signal-generating member SGU1 comprises a calculating member 91 which is supplied with the ordinal numbers n, a value of the system frequency ω, and a synchronization signal SYNC and, in dependence on these supplied values, generates as output signals the calculating signals SCOSn=cos(nωt) and SSINn=−sin(nωt). The signal SYNC is formed in some manner known per se, by sensing of the voltage of the alternating-voltage network, for synchronization of the phase position of the calculating signals SCOSn and SSINn relative to the zero crossing for the voltage in a chosen phase of the alternating-voltage network N1.

The signal-generating member SGU2 comprises a delay member 921 with a time delay Td, capable of being influenced, a quotient-forming member 922 and a calculating member 923. A value of the first compensating signal β$_n$, which value is formed by an identification unit, the ordinal number n and the system frequency ω are supplied to the quotient-forming member, which as output signal forms the quotient $$Td=\beta_n/n\omega \tag{44}$$

which value together with the synchronization signal is supplied to the delay member. This forms as output signal a delayed synchronization signal SYNCD, delayed by the time Td in relation to the synchronization signal SYNC. The calculating signal 923 is supplied with the ordinal number n, the value ω of the system frequency, a value formed by an identification unit of the second compensating parameter KGn as well as the delayed synchronization signal SYNCD and generates, in dependence on these supplied values, as output signals the compensating signals SCMnr=KGn*cos (nωt+β$_n$) and SCMni=−KGn*sin(nωt+β$_n$).

Figure 10:
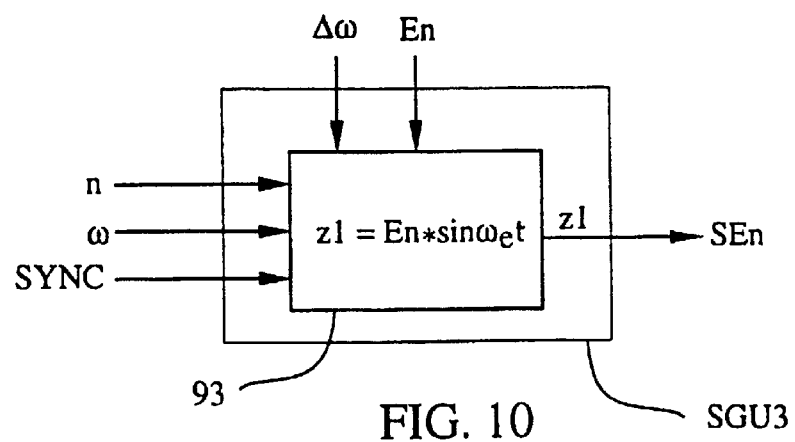
FIG. 10 shows, in the form of a block diagram, the formation of an excitation signal in a setting unit according to FIG. 9.

FIG. 10 schematically shows a signal-generating member SGU3 which is comprised in the control equipment 5 and which, in turn, comprises a calculating member 93 which forms the excitation signal SEn. The calculating member is supplied with the ordinal number n, a value of the system frequency ω, a value of the frequency distance Δω of the excitation frequency ω$_e$ from the tone nω, advantageously chosen according to the expression (19), a value of the chosen amplitude En of the excitation signal as well as the synchronization signal SYNC, and generates, in dependence on these supplied values, as output signal the excitation signal SEn=En*sin(ω$_e$t).

In an additional advantageous embodiment of the invention, in which the control equipment is applicable parts operates with sampled signals and, for example, the above-described members and controllers are designed as software for implementation in process computers, various parts of the equipment are adapted to operate at different sampling frequencies. Thus, the first, second, third and fourth frequency-transforming members may operate with a first sampling frequency SF1 and the controlling member CD, the bandpass-filtering members BPD1, BPD2 and the third identification member IDD to operate with a second sampling frequency SF2, lower than the first one, in that the first, second and third frequency-transforming members essentially transform supplied signals from the tone frequency nω to the frequency zero. This is marked in FIGS. 6A, 6B, 7, 9 and 12 double arrows marked SF1 or SF2.

Figure 12:
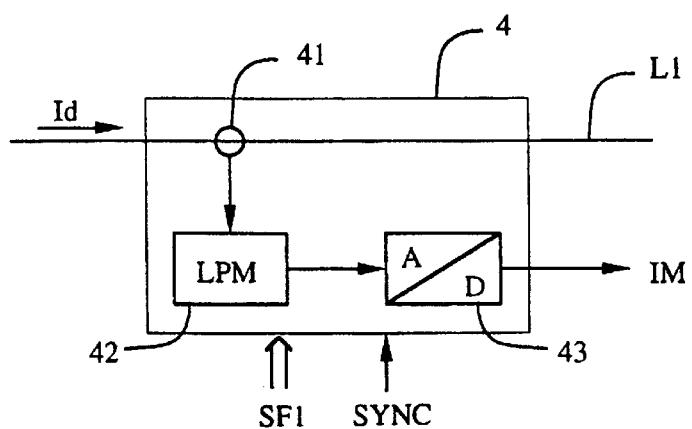
FIG. 12 shows an embodiment of a current measuring device in an installation according to FIG. 2, and FIGS. 13–17 show, in the form of an explanatory block diagram, an additional number of embodiments of a control unit for control equipment according to the invention.

An embodiment of the current measurement device 4, which is advantageous in this case, is shown FIG. 12. A current sensing member 41, arranged at the conductor L1 (FIG. 2), supplies to a low-pass filter 42, arranged in the current measuring device, with a measured value of the ac component Idh(t) of the current Id. The output signal from the low-pass filter is supplied to an analog/digital converting member 43 which forms the output signal IM. The analog/digital converting member operates synchronously with other sampled operating means in the control equipment with the sampling frequency SF1, synchronized by means of the signal SYNC described above. The low-pass filter 42 is advantageously given a transfer function such that the filter essentially filters away signals with a frequency content higher than half the sampling frequency SF1.

Typically, in a controlling unit and an identification unit, respectively, for a tone with the tone frequency $n\omega/2\pi=750$ Hz, the first sampling frequency may be chosen to be approximately SF1=13 kHz and the second sampling frequency may be chosen to be approximately SF2=200 Hz. By using a lower sampling frequency for these members, the need of calculation capacity is considerably reduced, which implies lower demands on process computers and/or a lower number of process computers.

In this embodiment, it has also proved to be additionally advantageous to design each of the low-pass filters comprised in the frequency-transforming members FTD1, FTD2 and FTD4 as two mutually cascade-connected low-pass filters. The first of these cascade-connected filters, which is supplied with the output signal from the respective multiplying member, is adapted to operate with the sampling frequency SF1 and is given a transfer function such that the filter essentially filters away signals with a frequency content higher than half the sampling frequency. The second of these filters, which is supplied with the output signal from the first filter in the cascade connection and the output signal of which consists of respective signals S12, S13, S20, S21, S24 and S25, is adapted to operate at the lower sampling frequency and is given transfer functions of the kinds which have been described above with reference to the respective filters 65, 66, 713, 714, 723 and 724.

The identification unit described above may at least in certain applications be used intermittently, that is, be temporarily connected to the controlling unit in dependence on an identification order IDON, whereby the signal-generating member SGU2 is adapted to generate the calculating signal SCMn in dependence on the last calculated compensating parameter values.

Figure 13:
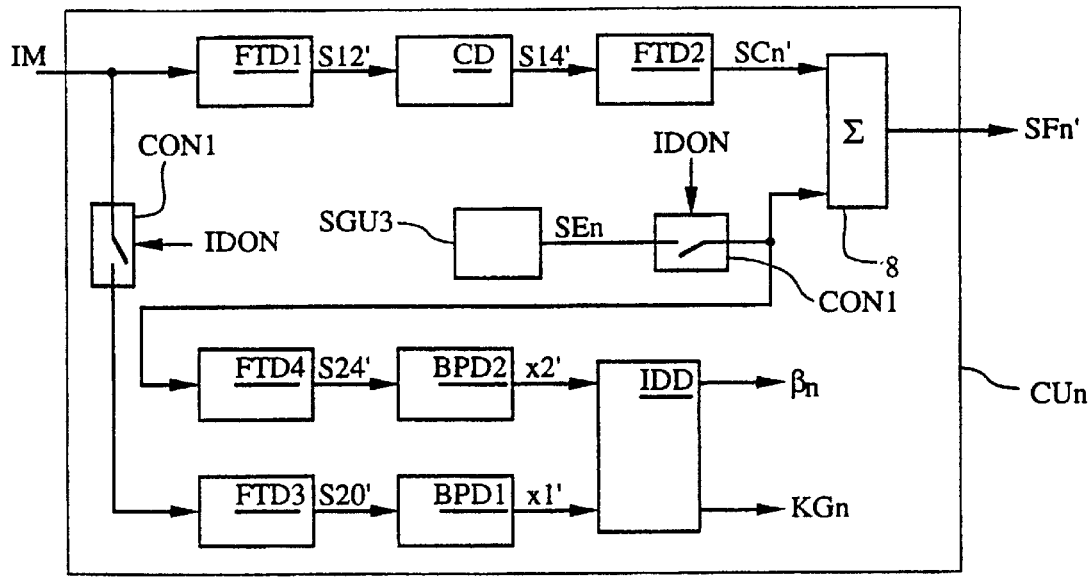

FIG. 13 shows in the form of a block diagram an embodiment of a control unit in which the respective blocks have been given the same designations as the corresponding blocks in FIGS. 6A, 6B. In addition thereto, the figure shows a connection member CON1, which, in dependence on the identification order IDON, connects the excitation signal SEn to the summing member 8 and to the fourth frequency-transforming member FTD4 and the current measurement value IM to the third frequency-transforming member FTD3, respectively. To simplify the figure, the signal-generating members SGU1 and SGU2 are not shown.

The invention is not limited to the embodiments shown but a plurality of modifications are feasible within the scope of the inventive concept. In the FIGS. 14–17, which will be described below, and in FIG. 13 described above, the reference numerals designate members and signals of the same kind as those described with reference to FIGS. 6A, 6B and 8.

Figure 14:
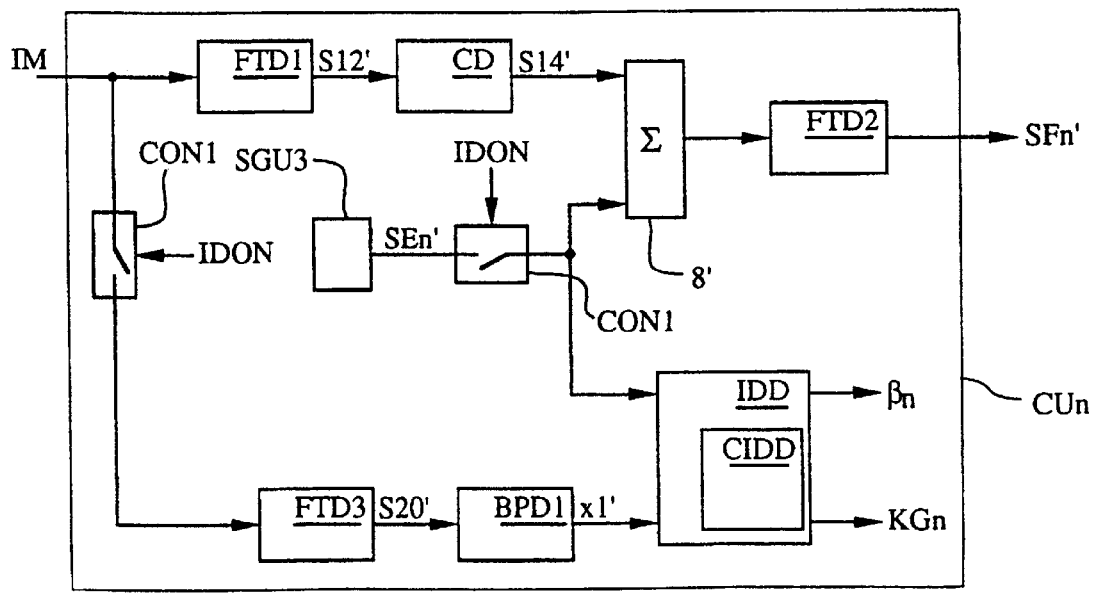

FIG. 14 shows another embodiment of a control unit according to the invention. The difference in relation to the embodiment according to FIG. 13 is that the summing member 8 in this case is replaced by a summing member 8', arranged before the second frequency-transforming member FTD2 and the output signal of which is supplied to this frequency-transforming member. The summing member 8' forms the sum of the output signal S14' of the controlling unit and of the excitation signal SEn', when the latter is connected to the summing member 8'. In this case, thus, the influencing signal SFn' comprises both the control signal SCn' and, when the excitation signal is connected to the summing member 8', a component of the excitation frequency $\omega_e$.

In this embodiment, the signal-generating member SGU3 generates an output signal which, expressed in complex quantities, is of the form $$SEn' = En^* e^{j(\omega_e - n\omega)t} \tag{45}$$

and the component of the excitation frequency $\omega_e$, comprised in the influencing signal, is formed by multiplication of the output signal according to the expression (46) by the compensating signal $SCMn = KGn^* e^{j(n\omega t + \beta_n)}$ in the second frequency-transforming member FTD2.

The output signal from the signal-generating member SGU3 is supplied directly to the third identification member IDD. The above-mentioned second identification signal and third filter signal thus consist, in this embodiment, of the output signal according to the expression (45). Calculations show that in this case the third identification member IDD is to comprise a filter-compensating member CIDD for compensation of the amplification factor KGn/2 and the phase shift $\beta_n$ in the second frequency-transforming member FTD2. In addition thereto, this filter-compensating member may advantageously be adapted to compensate for the amplitude amplification ABPDI and the phase shift PHBPD1 which the first bandpass-filtering member BPD1 and the low-pass-filtering member LPI comprised in the third frequency-transforming member exhibit at the difference frequency $(\omega_e - n\omega)$.

Figure 15:
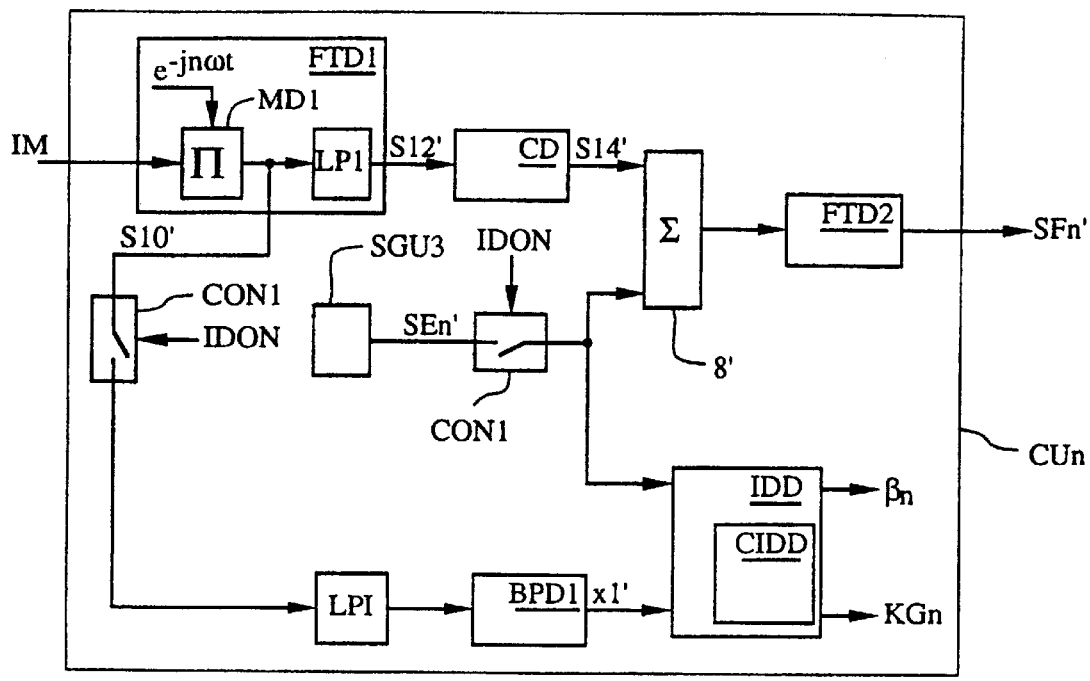

An additional embodiment is illustrated in FIG. 15, the difference in relation to that described in FIG. 14 being that, in this embodiment, the third frequency-transforming member FTD3 is replaced by the low-pass filter LPI described with reference to FIG. 6B and that the signal supplied to this low-pass filter does not consist of the current measurement value IM supplied to the controlling unit but of the output signal S10' from the multiplying member MD1 comprised in the first frequency-transforming member FTD1. The above-mentioned first identification member S10' thus comprises, in this embodiment, the multiplying member MD1. As is realized from the description with reference to the expression (14) above, the output signal S10' during the identification comprises the components $(An/2j)^* e^{j(\alpha_n)}$ and $(Ae/2j) * e^{j[(\omega_e - n\omega)t + \gamma_e]}$ which are relevant to the function of the control unit. This means that, in this embodiment, the multiplying member MD3, comprised in the third frequency-transforming member, may be eliminated.

Figure 16:
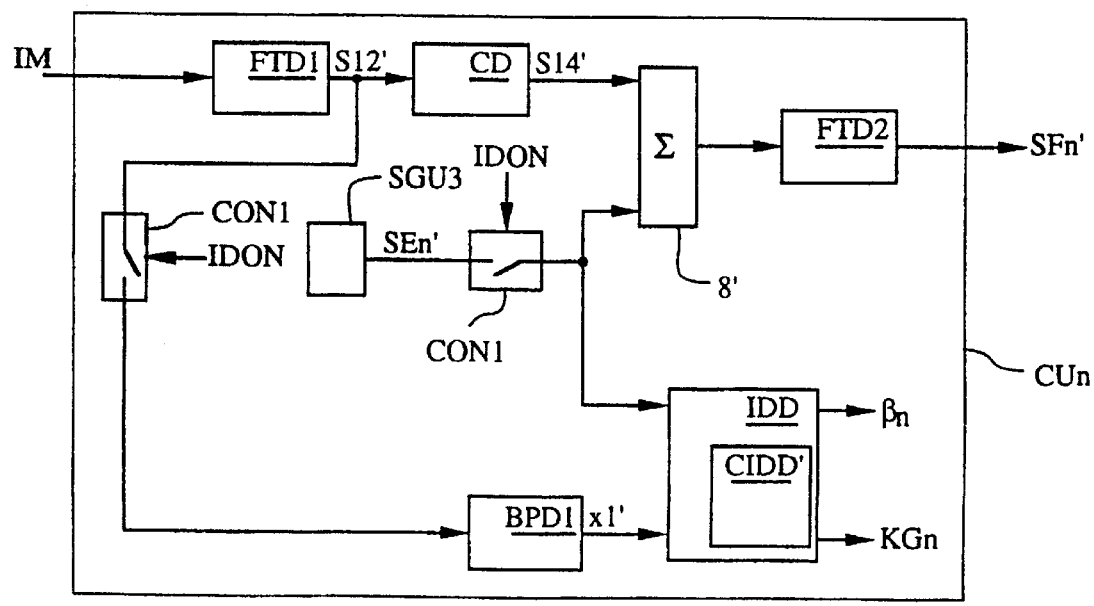

In an embodiment according to FIG. 16, as opposite to the embodiment according to FIG. 15, the output signal S12' from the frequency-transforming member FTD1 is supplied directly to the first bandpass-filtering member BPD1. In this case, the output signal S12' during the identification comprises the same components as the signal S10' in an embodiment according to FIG. 15. In an embodiment according to FIG. 16, the third identification member shall comprise a filter-compensating member CIDD', which compensates for the amplification factor KGn/2 and the phase shift $\omega_n$ in the second frequency-transforming member FTD2, mentioned with reference to the embodiment according to FIG. 14. In addition thereto, the filter-compensating member CIDD' may advantageously be adapted to compensate for the amplitude amplification ABPD1' and the phase shift PHBPD1' which the first band-pass-filtering member BPD1 and the low-pass-filtering member LP1, comprised in the first frequency-transforming member, exhibit at the difference frequency $(\omega_e - n\omega)$.

Figure 17:
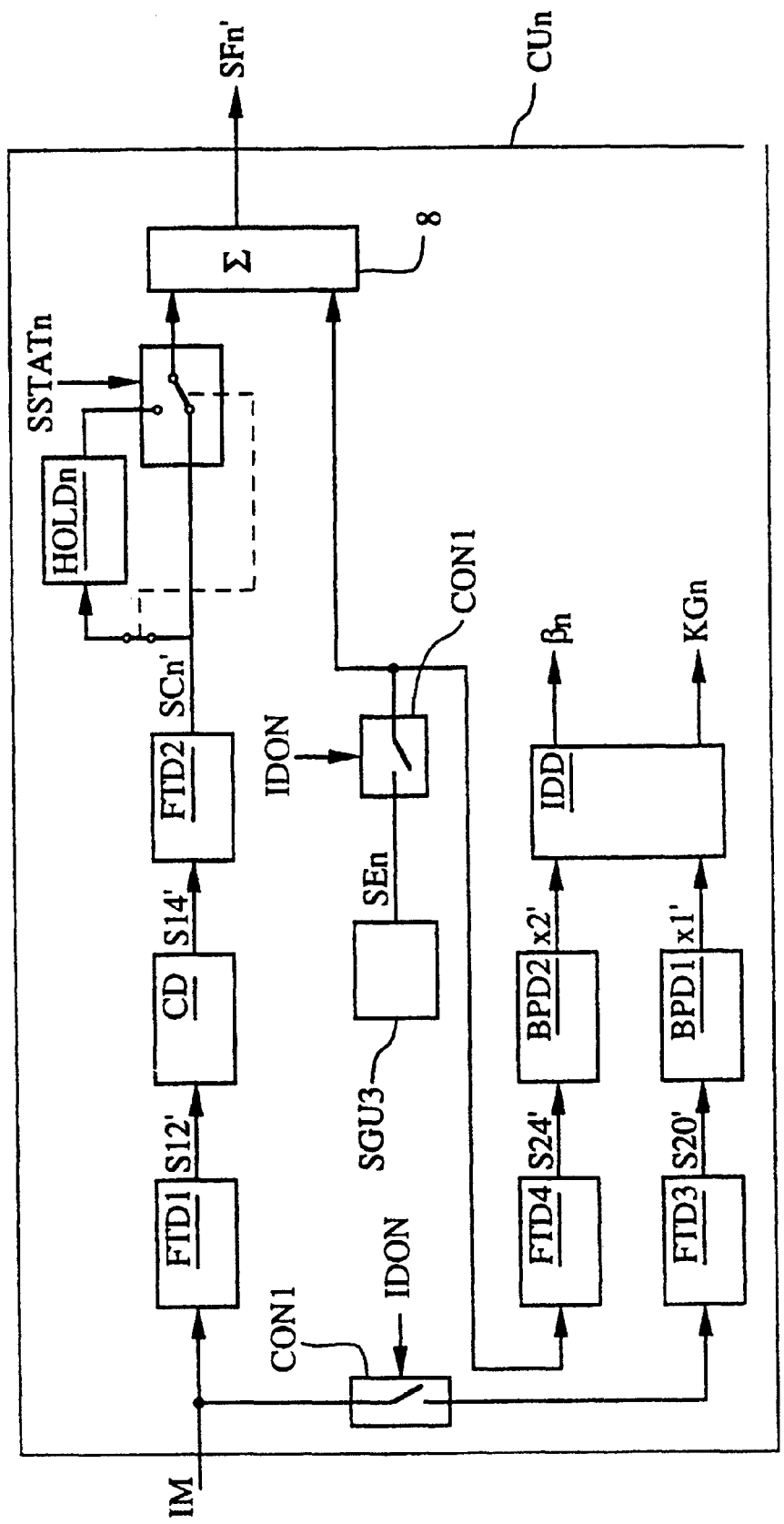

Still another embodiment of the invention is illustrated in FIG. 17. The embodiment differs from that described with reference to FIG. 13 in that the control equipment comprises a holding means (HOLDn) which is supplied with the control signal SCn' from the second frequency-transforming member FTD2. In dependence on a supplied control signal holding order SSTATn, this holding means maintains the control signal for a chosen tone frequency at values which are constant with respect to its amplitude and its phase angle when the excitation signal for the chosen tone frequency occurs.

The embodiments shown in FIGS. 13–17 may, of course, be individually designed to carry out the signal processing by multiplications by calculating signals SCOSn, SSINn, SCMnr and SCMni instead of by calculating signals in complex exponential form. This can be done in a manner analogous to that described for the embodiment according to FIG. 13 (and FIGS. 6A, 6B) designed as described with reference to FIGS. 6A, 6B and 8. These calculations are not demonstrated here since, like the calculations for the embodiments according to FIGS. 13–17, they may be carried out by the person skilled in the art on the basis of the above description.

The above-mentioned identification, carried out at a certain excitation frequency $\omega_e$, may also be carried out repeatedly at different values of the excitation frequency, whereupon the compensating parameter values $\beta_n$ och KGn may be formed by interpolation or extrapolation of the calculating values, thus obtained, of the amplitude amplification HIAn and the phase shift HIPHn of the transfer function HI(s).

In equations 11 and 12 above, the assumption has been made that the identification unit(s) mentioned form(s) the first compensating parameter such that the sum of this and of the phase shift for a transfer function from the control signal to the current measurement value at the chosen tone frequency is at least approximately equal to ZERO and forms the second compensating parameter such that the product of this and of the amplitude amplification for the transfer function mentioned, at the chosen tone frequency, is at least approximately equal to MINUS ONE. It is, of course, possible, and within the scope of the invention, instead to the make the assumption that the identification unit(s) mentioned form(s) the first compensating parameter such that the sum of this and of the phase shift for the transfer function mentioned at the chosen tone frequency is at least approximately equal to a preselected value ($\Delta\beta_n$), and forms the second compensating parameter such that the product of this and of the amplitude amplification for the transfer function mentioned at the chosen tone frequency is at least approximately equal to a preselected negative number ($\Delta$KGn). This may be achieved by some method known to the person skilled in the art by modification of the identification member.

It is also within the scope of the invention that the active filter may be adapted to generate and supply to the dc circuit a filter current instead of a filter voltage, for example in some way shown in the literature mentioned in the introductory part of this application.

We claim:

1. Control equipment (5) for an active filter (2), connected to a dc circuit (L1, L2) in a converter (SR1) in an installation for transmission of high-voltage direct current, which converter is connected on its ac side to an electric power network (N1) with a system frequency ($\omega$), wherein the active filter, in dependence on control order (SCF) generated by the control equipment, generates and supplies to the dc connection one of a filter voltage (UF) and a filter current (IF) for reducing at least one tone (An*sin [n$\omega$t+$\alpha_n$]) of a chosen tone frequency (n$\omega$) in a current (Id) in the dc connection, and the control equipment forms the control order in dependence on a control signal (SCn', SCn) of the chosen tone frequency, which control equipment comprises a controlling unit (6), which is supplied with a current measurement value (IM) of the current in the dc connection, which value comprises at least the tone of the chosen tone frequency, and, in dependence thereon, by a frequency transformation from the chosen tone frequency to the frequency ZERO, forms a first filter signal (S12', S12 and S13), in dependence on this filter signal, by signal processing in a controlling member (CD) with proportional-integrating characteristic, forms a controller signal (S14', S14 and S15) and, in dependence on the controller signal and on a first compensating parameter ($\beta_n$), forms the control signal, characterized in that the control equipment further comprises excitation-generating means (SGU3, FTD2, 8, 8') which generate and add to the control order an excitation signal (SEn) of an excitation frequency ($\omega_e$), and an identification unit (7) which forms and supplies to the controlling unit the first compensating parameter, which identification unit is supplied with a first identification signal (IM, S10', S10, S11, S12, S13), which is dependent on the current measurement value, and a second identification signal (SEn, SEn', SFn, SFn'), sensed at said excitation-generating means and the amplitude and frequency of which are related to the excitation signal, and which, in dependence on said identification signals, forms the first compensating parameter such that the sum of this and of the phase shift for a transfer function from the control signal to the current measurement value at the chosen tone frequency is at least approximately equal to a preselected value ($\Delta\beta_n$).

2. Control equipment according to claim 1, wherein the controlling unit comprises a first frequency-transforming member (FTD1), which is supplied with the current measurement value and, in dependence thereon, forms the first filter signal, characterized in that the first frequency-transforming member comprises at least one filter member (LP1, 65, 66) with a transfer function of low-pass character, so chosen that the filter member from the supplied signal essentially eliminates components of frequencies, different from ZERO, which constitute a sum ((k+n)$\omega$) or a difference ((k−n)$\omega$) of integer multiples (k$\omega$) of the system frequency and of the chosen tone frequency (n$\omega$), and that the first filter signal is formed in dependence on an output signal from the filter member.

3. Control equipment according to claim 1, characterized in that the controlling unit forms the control signal in dependence also on a second compensating parameter (KGn), and the identification unit, in dependence on the first and second identification signals, forms the second compensating parameter such that the product of this and of the amplitude amplification for the transfer function from the control signal to the current measurement value at the chosen tone frequency is at least approximately equal to a preselected negative number ($\Delta$KGn) and supplies to the controlling unit the second compensating parameter.

4. Control equipment according to claim 1, characterized in that the identification unit comprises first identification members (FTD3, MD3, LPI, BPD1), to which the first identification signal is supplied and which, in dependence thereon, form a second filter signal (x1' and x1, x2, respectively) of a frequency equal to the difference frequency ($\omega_e$−n$\omega$) between the excitation frequency and the chosen tone frequency, comprising a first and a second component (Ae, $e^{j\gamma}$e and $$\frac{Ae}{2}$$

$\sin(\gamma_e)$ and $$\frac{Ae}{2}$$

$\cos(\gamma_e)$, respectively), which together contain information about the amplitude and phase position (Ae, γe, respectively) of the current measurement value for the excitation frequency, second identification members (FTD4, BPD2), to which the second identification signal is supplied and which, in dependence thereon, form a third filter signal (x2' and x3, x4, respectively) of the difference frequency, containing information about the amplitude (En) of the excitation signal, and a third identification member (IDD), to which the second and third filter signals are supplied and which, in dependence thereon, forms at least the first compensating parameter.

5. Control equipment according to claim 1, characterized in that the second identification signal is of a frequency equal to the excitation frequency.

6. Control equipment according to claim 1, characterized in that the second identification signal is of a frequency equal to the difference frequency ($\omega_e - n\omega$) between the excitation frequency and the chosen tone frequency.

7. Control equipment according to claim 1, characterized in that the second identification signal is of a frequency equal to the difference frequency ($\omega_e - n\omega$) between the excitation frequency and the chosen tone frequency, and that the identification unit comprises first identification members (FTD1, MD1, FTD3, LPI, BPD1), to which the first identification signal is supplied and which, in dependence thereon, form a second filter signal (x1' and x1, x2, respectively) of a frequency equal to the difference frequency, comprising a first and a second component (Ae, $e^{j\gamma_e}$ and $$\frac{Ae}{2}$$

$\sin(\gamma_e)$ $$\frac{Ae}{2}$$

$\cos(\gamma_e)$, respectively), which together contain information about the amplitude and phase position (Ae and $\gamma_e$, respectively) of the current measurement value for the excitation frequency, and a third identification member (IDD), which is supplied with the second filter signal and the second identification signal, and which, in dependence thereon, forms at least the first compensating parameter.

8. Control equipment according to claim 6, wherein the controlling unit comprises a second frequency-transforming member (FTD2), which is supplied with the controlling signal and, in dependence thereon and in dependence on at least the first compensating parameter, forms the control signal of the chosen tone frequency, characterized in that said excitation-generating means (SGU3) generate and supply to the second frequency-transforming member an input signal (SEn') with a frequency equal to the difference frequency, and that the second frequency-transforming member by a frequency transformation from the difference frequency to the excitation frequency generates the excitation signal in dependence on said input signal.

9. Control equipment according to claim 4, characterized in that the first identification signal is formed in dependence on the first filter signal.

10. Control equipment according to claim 1, characterized in that it comprises a first and a second control unit (CUn1, CUn2, respectively), each one associated with a chosen first and second tone frequency (n1ω and n2ω, respectively), each of said control units comprising a controlling unit which forms the control signal for the tone frequency associated with the respective control unit, excitation-generating means (SGU3, FTD2, 8) which generate and add to the control order an excitation signal (SEn) of an excitation frequency ($\omega_e$) associated with the respective control unit, a first summing member (8), which for each of the control units forms an influencing signal (SFn1 and SFn2, respectively) in dependence on a sum of the control signal and the excitation signal, an identification unit which generates at least the first compensating parameter for the tone frequency associated with the respective control unit in dependence on the first and second identification signals, and a second summing member (CES) which forms the control order in dependence on a sum of the influencing signals.

11. Control equipment according to claim 1, characterized in that it comprises a first and a second controlling unit (6n1, 6n2, respectively), each one associated with a chosen first and second tone frequency (n1ω, n2ω, respectively), corresponding to a first and a second ordinal number (n1, n2, respectively), and identification equipment (7'), which identification equipment comprises excitation-generating means (SGU3, FTD2, 8), which, in dependence on a supplied ordinal number, generate and add to the control order an excitation signal (SEn) of an excitation frequency ($\omega_e$), an identification unit (7) which, in dependence on the first and second identification signals and on a supplied ordinal number, generates at least the first compensating parameter, a first selector member (746) which is supplied with the first and second ordinal numbers and, in dependence on a supplied tone selection order (SSEL), forwards one of these ordinal numbers to the identification unit and to said excitation-generating means, a second selector member (747) which is supplied with said forwarded ordinal number and the at least first compensating parameter, generated by the identification unit, and, in dependence on the tone selection order, forwards said compensating parameter to that controlling unit which is associated with the tone frequency corresponding to said forwarded ordinal number, and a third summing member (CES') which forms the control order in dependence on a sum of the control signals and of the excitation signal.

12. Control equipment according to claim 4, characterized in that it comprises a coupling member (CON1) which, in dependence on a supplied identification order (IDON), couples respectively the first identification signal and the second identification signal to the identification unit.

13. Control equipment according to claim 1, characterized in that it comprises a holding member (HOLDn) which, in dependence on a supplied control signal holding order (SSTATn), maintains the control signal for a chosen tone frequency at constant values with respect to the amplitude and phase angle of said control signal when the excitation signal for the chosen tone frequency occurs.

14. Control equipment according to claim 1, wherein the controlling unit senses and forms the respective signals in sampled form, characterized in that the controlling unit forms the first filter signal and the control signal with a first sampling frequency (SF1) and the controlling signal with a second sampling frequency (SF2), lower than the first sampling frequency.

15. Control equipment according to claim 4, wherein the identification unit senses and forms the respective signals in sampled form, characterized in that the first identification member comprises a third frequency-transforming member and a first bandpass-filtering member, the second identification member comprises a fourth frequency-transforming member and a second bandpass-filtering member, and that the third and fourth frequency-transforming members operate with a first sampling frequency (SF1) and the third identification member and at least one of the first and the second bandpass-filtering members operates with a second sampling frequency (SF2), lower than the first sampling frequency.

16. Control equipment according to claim 14, characterized in that the first sampling frequency is at least 50 times higher than the second sampling frequency.

17. Control equipment according to claim 1, characterized in that said identification unit(s) form(s) the first compensating parameter such that the sum of this and of the phase shift for a transfer function from the control signal to the current measurement value at the chosen tone frequency is at least approximately equal to ZERO.

18. Control equipment according to claim 1, characterized in that said identification unit(s) form(s) said second compensating parameter such that the sum of this and of the amplitude amplification for the transfer function from the control signal to the current measurement value at the chosen tone frequency is at least approximately equal to MINUS ONE.

19. An installation for transmission of high-voltage direct current, comprising control equipment according to claim 1, characterized in that the ordinal number (n) of the chosen tone frequency (nω) is an integer multiple of the pulse number (p) of the converter.

* * * * *